(12) United States Patent
Kim et al.

(10) Patent No.: US 10,698,260 B2
(45) Date of Patent: Jun. 30, 2020

(54) LIQUID CRYSTAL DISPLAY (LCD) DEVICE

(71) Applicant: LG Display Co., Ltd., Seoul (KR)

(72) Inventors: Ji Soo Kim, Paju-si (KR); Jae Lyang Kim, Paju-si (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 16/175,992

(22) Filed: Oct. 31, 2018

(65) Prior Publication Data

US 2019/0137829 A1     May 9, 2019

(30) Foreign Application Priority Data

Nov. 9, 2017  (KR) .......................... 10-2017-0148616

(51) Int. Cl.
    *G02F 1/13357* (2006.01)

(52) U.S. Cl.
    CPC .. *G02F 1/133608* (2013.01); *G02F 1/133603* (2013.01); *G02F 1/133605* (2013.01); *G02F 1/133606* (2013.01); *G02F 1/133611* (2013.01); *G02F 2202/28* (2013.01)

(58) Field of Classification Search
    CPC ......... G02F 1/133603; G02F 1/133606; G02F 1/133608; G02F 2001/133317
    See application file for complete search history.

(56) References Cited

U.S. PATENT DOCUMENTS

| 2003/0234896 | A1* | 12/2003 | Kim ................. G02F 1/133604 349/65 |
| 2017/0153499 | A1 | 6/2017 | Yang |
| 2017/0315408 | A1* | 11/2017 | Lee .................. G02F 1/133308 |
| 2018/0113353 | A1* | 4/2018 | Chen ................ G02F 1/133528 |
| 2018/0188591 | A1* | 7/2018 | Park ................. G02F 1/133504 |

FOREIGN PATENT DOCUMENTS

| KR | 10-2008-0080764 A | 9/2008 |
| KR | 10-2009-0061321 A | 6/2009 |
| KR | 10-2011-0135703 A | 12/2011 |
| KR | 10-2012-0136935 A | 12/2012 |
| KR | 10-2017-0061312 A | 6/2017 |
| KR | 10-2017-0118356 A | 10/2017 |

OTHER PUBLICATIONS

Office Action dated Feb. 25, 2019, issued in corresponding Korean Application No. 10-2017-0148616.

* cited by examiner

*Primary Examiner* — Thanh Nhan P Nguyen
(74) *Attorney, Agent, or Firm* — Morgan, Lewis & Bockius LLP

(57) ABSTRACT

A liquid crystal display device includes: a backlight unit including: a light-emitting diode (LED) assembly including a plurality of LEDs, a glass diffuser above the LEDs, and a reflector under the LEDs, a liquid crystal panel above the glass diffuser, a portion of a back edge thereof being attached to the glass diffuser by a first adhesive member having a first width, a main frame surrounding a side of the liquid crystal panel and the backlight unit, the main frame including: a vertical portion, and a guide bar, the guide bar protruding from the vertical portion, and a bottom frame including a lower surface under the backlight unit, wherein the glass diffuser is above the main frame, and wherein the main frame is attached to a portion of the glass diffuser by a second adhesive member having a second width greater than the first width.

19 Claims, 21 Drawing Sheets
(8 of 21 Drawing Sheet(s) Filed in Color)

LIQUID CRYSTAL DISPLAY (LCD) DEVICE

CROSS-REFERENCE TO RELATED APPLICATION(S)

This application claims the benefit of and priority to Korean Patent Application No. 10-2017-0148616, filed on Nov. 9, 2017, in the Korean Intellectual Property Office, the entirety of which is hereby incorporated by reference.

BACKGROUND

1. Technical Field

The present disclosure relates to a liquid crystal display (LCD) device, and more For example, to a liquid crystal display device having a narrow bezel.

2. Discussion of the Related Art

Recently, with the development of information technology and mobile communication technology, display devices capable of visually displaying information have been developed. A display device may be broadly classified as a self-light-emitting display device having a light-emitting property and a non-light-emitting display device on which an image can be displayed through an external factor.

An example of a non-light-emitting display device may include a liquid crystal display (LCD) device. Here, the LCD device requires a separate light source because the LCD device is an element that does not have a self-light-emitting element. Accordingly, a backlight unit having a light source is provided on a rear side of a liquid crystal panel of the LCD device to emit light toward the liquid crystal panel. Thus, a visible image is provided.

The backlight unit may include a light source, e.g., a cold-cathode fluorescent lamp (CCFL), an external electrode fluorescent lamp (EEFL), or a light-emitting diode (LED). Because the LED has characteristics of a small size, low power consumption, high reliability, and the like, the LED is widely used as the light source.

A backlight unit may be classified into a side light type backlight unit and a direct light type backlight unit according to an arrangement structure of the light source (lamp). The side light type backlight unit has a structure in which one lamp or a pair of lamps are arranged at one side of a light guide plate or a structure in which two lamps or two pairs of lamps are arranged at both sides of the light guide plate. The direct light type backlight unit has a structure in which several lamps are arranged below an optical sheet. Recently, with research on large-sized LCD devices by consumer's demands is being actively conducted, a direct light type backlight unit is more appropriate for a large-sized LCD device than a side light type backlight unit.

FIG. 1 is a cross-sectional view of a direct light type LCD device using an LED as a light source.

As shown in the example of FIG. 1, an LCD device 1 may include a liquid crystal panel 10 including first and second substrates 12 and 14, and a backlight unit 20 positioned under the liquid crystal panel 10. The backlight unit 20 may include a reflector 22 and a plurality of LEDs 28 arranged in parallel on the reflector 22. A diffuser 26 and a plurality of optical sheets 27 are positioned above the LEDs 28. Light emitted from two or three neighboring LEDs 28 overlap and are mixed with each other, and then are incident on the liquid crystal panel 10 to provide a plane light source.

The liquid crystal panel 10 and the backlight unit 20, including the LEDs 28, are modularized using a top frame 40 that surrounds a front edge of the liquid crystal panel 10, a main frame (a guide panel) 30 that covers a side of the liquid crystal panel 10 and the backlight unit 20, and a bottom frame 50 that covers a rear surface of the backlight unit 20. For example, the top frame 40 and the bottom frame 50 are combined to the main frame 30 in a front-to-rear direction of the liquid crystal panel 10 and the backlight unit 20.

Meanwhile, in recent years, such an LCD device 1 has been widely used in a wider range of applications, such as a portable computer, a desktop computer monitor, a wall-mounted television, and the like. Research is also being actively conducted on an LCD device having a weight and volume that has been dramatically reduced while having a wide display area. In addition, the LCD device 1 should have a narrow bezel in which a display region is wide and a bezel region, e.g., a non-display region other than the display region, is as small as possible.

SUMMARY

Accordingly, embodiments of the present disclosure are directed to a liquid crystal display (LCD) device that substantially obviates one or more of the issues due to limitations and disadvantages of the related art.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts as embodied and broadly described, there is provided a liquid crystal display device, including: a backlight unit including: a light-emitting diode (LED) assembly including a plurality of LEDs, a glass diffuser above the plurality of LEDs, and a reflector under the plurality of LEDs, a liquid crystal panel above the glass diffuser, a portion of a back edge of the liquid crystal panel being attached to the glass diffuser by a first adhesive member having a first width, a main frame surrounding a side of the liquid crystal panel and the backlight unit, the main frame including: a vertical portion, and a guide bar, the guide bar protruding from the vertical portion, and a bottom frame including a lower surface under the backlight unit, wherein the glass diffuser is above the main frame, and wherein the main frame is attached to a portion of the glass diffuser by a second adhesive member having a second width greater than the first width.

In another aspect, there is provided a display device, including: a backlight unit, and a display panel above the backlight unit, wherein the backlight unit may include an optical film provided below the display panel, and wherein the optical film may include: a plurality of base layers arranged at particular intervals in a horizontal direction, and a plurality of barriers respectively provided between pairs of the plurality of base layers, wherein each of the plurality of barriers may include first and second films inclined with a first inclined angle with respect to a lower surface of each of the plurality of base layers, wherein the first film is configured to: transmit light polarized in a first direction, and reflect light polarized in a second direction perpendicular to the first direction, and wherein the second film is configured to phase-retard the light polarized in the first direction to the light polarized in the second direction.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure. It is to be understood that both the foregoing general description and the following detailed description of the present disclosure are examples and explanatory, and are intended to provide further explanation of the disclosure as claimed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, that may be included to provide a further understanding of the disclosure and are incorporated in and constitute a part of this disclosure, illustrate embodiments of the disclosure and together with the description serve to explain various principles of the disclosure.

Figure 1:
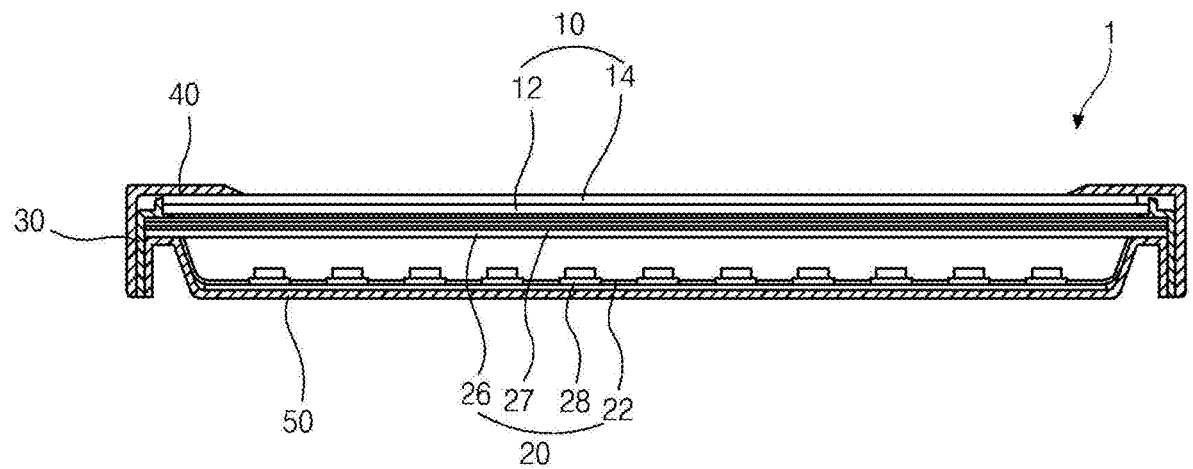
FIG. 1 is a cross-sectional view of a direct light type liquid crystal display (LCD) device using a light-emitting diode (LED) as a light source.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure. Further, the present disclosure is only defined by scopes of claims.

A shape, a size, a ratio, an angle, and a number disclosed in the drawings for describing embodiments of the present disclosure are merely an example. Thus, the present disclosure is not limited to the illustrated details. Like reference numerals refer to like elements throughout. In the following description, when the detailed description of the relevant known function or configuration is determined to unnecessarily obscure an important point of the present disclosure, the detailed description of such known function or configuration may be omitted. In a case where terms "comprise," "have," and "include" described in the present disclosure are used, another part may be added unless a more limiting term, such as "only," is used. The terms of a singular form may include plural forms unless referred to the contrary.

In construing an element, the element is construed as including an error or tolerance range even where no explicit description of such an error or tolerance range. In describing a position relationship, when a position relation between two parts is described as, for example, "on," "over," "under," or "next," one or more other parts may be disposed between the two parts unless a more limiting term, such as "just" or "direct(ly)," is used.

In describing a time relationship, when the temporal order is described as, for example, "after," "subsequent," "next," or "before," a case which is not continuous may be included unless a more limiting term, such as "just," "immediate(ly)," or "direct(ly)," is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms like "first," "second," "A," "B," "(a)," and "(b)" may be used. These terms are merely for differentiating one element from another element, and the essence, sequence, order, or number of a corresponding element should not be limited by the terms. Also, when an element or layer is described as being "connected," "coupled," or "adhered" to another element or layer, the element or layer can not only be directly connected or adhered to that other element or layer, but also be indirectly connected or adhered to the other element or layer with one or more intervening elements or layers "disposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

Hereinafter, example embodiments of the present disclosure will be described in detail with reference to the accompanying drawings.

Figure 2:
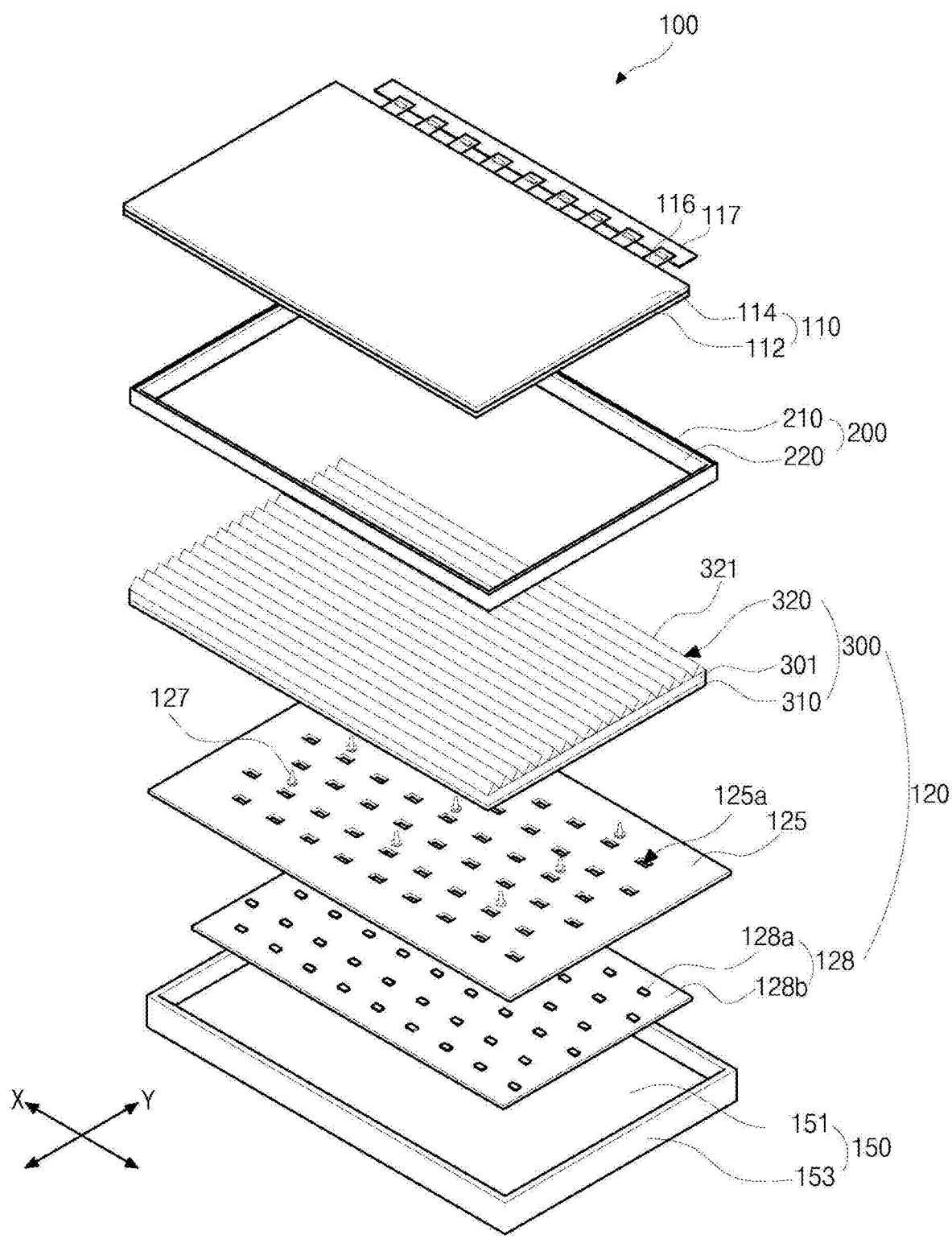
FIG. 2 is an exploded perspective view showing an LCD device according to an example embodiment of the present disclosure.

FIG. 2 is an exploded perspective view showing a liquid crystal display (LCD) device according to an example embodiment of the present disclosure.

As shown in the example of FIG. 2, an LCD device 100 according to an example embodiment of the present disclosure may include a liquid crystal panel 110, a backlight unit 120, a main frame 200, and a bottom frame 150. The main frame 200 and the bottom frame 150 may be used for modularizing the liquid crystal panel 110 and the backlight unit 120.

For convenience of description, directions in the drawing are presumed to be directions of a display surface of the liquid crystal panel 110 that face forward. The backlight unit 120 may be behind the liquid crystal panel 110. The liquid crystal panel 110 may be in a front side of the backlight unit 120 such that the rectangular frame-shaped main frame 200 surrounds an outer periphery of the backlight unit 120 and the liquid crystal display panel 110. The bottom frame 150 may be on a rear side of the backlight unit 120. The liquid crystal panel 110, the backlight unit 120, the main frame 200, and the bottom frame 150 may be combined to be integrated in a front-to-rear direction. Each of the above components will be described in further detail.

The liquid crystal panel 110 may include a first substrate 112 and a second substrate 114, which may face each other and may be bonded with each other, and a liquid crystal layer (not shown) therebetween. In an active matrix type LCD device, a plurality of gate lines and a plurality of data lines may be on an inner surface of the first substrate 112 which may be referred to as a "lower substrate" or an "array substrate." The gate lines and the data lines may cross each other to define pixels. A thin film transistor (TFT) may be at each of the crossing portion, and may be connected in a one-to-one correspondence with a corresponding transparent pixel electrode in each of the pixels.

A color filter, such as a red (R) color filter, a green (G) color filter, and/or a blue (B) color filter corresponding to each of the pixels, and a black matrix surrounding the color filter and covering non-display elements, such as the gate line, the data line, and the TFT, may be on an inner surface of the second substrate 114, which may be referred to as an "upper substrate" or a "color filter substrate." In addition, a transparent common electrode, which may cover the color filter and the black matrix, may be on the second substrate 114.

Although not shown, upper and lower alignment layers, which may define an initial alignment direction of a liquid crystal molecule, may be at interfaces between the two substrates 112 and 114 and the liquid crystal layer of the liquid crystal panel 110. A seal pattern (not shown) may be provided along edges of the two substrates 112 and 114 to prevent leakage of the liquid crystal layer. In addition, upper and lower polarizers 119b and 119a (of FIG. 3) may be respectively attached to outer surfaces of the first substrate 112 and the second substrate 114.

A printed circuit board (PCB) 117 may be connected to one side of the liquid crystal panel 110 through a connecting member 116, such as a flexible circuit board. In this case, the connecting member 116 may be attached and connected to a side surface of the liquid crystal panel 110.

The backlight unit 120, which may supply light, may be under the liquid crystal panel 110, such that a difference in transmittance ratio exhibited by the liquid crystal panel 110 may be externally expressed. The backlight unit 120 may include a light emitting diode (LED) assembly 128 under the liquid crystal panel 110, a reflector 125, and a glass diffuser 300 above the LED assembly 128 and spaced apart from the LED assembly 128 by a guide support 127.

The LED assembly 128, as a light source of the backlight unit 120, may include a plate-shaped PCB 128b and a plurality of LEDs 128a. The PCB 128b may be mounted inside a lower surface 151 of the bottom frame 150, and the LEDs 128a may be arranged on the PCB 128b to be spaced apart from each other.

To improve the emitting efficiency and the luminance of the LED assembly 128, the LED 128 may include a blue LED chip having high emitting efficiency and high luminance. The blue LED chip may include a phosphorescent material, e.g., cerium-doped yttrium aluminum garnet (YAG: Ce). For example, a yellow phosphor may be used. Blue light emitted from the LED chip may be mixed with yellow light emitted from the yellow phosphor. Thus, white light may be emitted toward the glass diffuser 300. Embodiments are not limited to these examples.

The reflector 125 may include a plurality of through-holes 125a through which the plurality of LEDs 128a may pass. The reflector 125 may cover all of the PCB 128b and the lower surface 151 of the bottom frame 150, except for the plurality of LEDs 128a, so that light directed toward a back side of the plurality of LEDs 128a may be reflected toward the glass diffuser 300. As a result, the luminance of the light may be improved.

The glass diffuser 300 for uniformity of luminance may be above the plurality of LEDs 128a exposed through the through-holes 125a of the reflector 125. The glass diffuser 300 may be supported by the guide support 127, such that the sagging problem of the glass diffuser 300 may be reduced or prevented.

The glass diffuser 300 may include a base substrate, which may include a transparent glass material, a diffusion layer 310 under the base substrate 301, and a first light concentration layer 320 on the base substrate 301. The diffusion layer 310 may include a light diffusing component, such as a bead, a fiber, or the like. The light diffusing component may disperse light to reduce or prevent the light from being partially concentrated. Accordingly, the diffusion layer 310 may refract and scatter incident light to diffuse the light.

The light diffusing component, such as the bead or the fiber, may be included in a binder resin. The binder resin may have high transparency, high transmittance, and easy viscosity control. For example, the binder resin may include polyethylene terephthalate (PET), polyethylene naphthalate, polymethyl methacrylate (PMMA), polycarbonate, polystyrene, polyolefine, celluloseacetate, polyvinyl chloride, and/or the like. Embodiments are not limited to these examples.

Although not shown, the diffusion layer 310 may include a fine pattern in addition to the light diffusing component, such as the bead or the fiber, and may adjust or control a scattering angle of light to diffuse the light and to process the light into uniform light. The fine pattern may be configured in various forms, such as an elliptical pattern, a polygonal pattern, and/or the like. The fine pattern may use a hologram pattern to refract light incident by an interference pattern in an asymmetrical direction with the incident direction of the light so that the collected light may be diffused at a further inclined angle. Therefore, the light may be dispersed by the diffusion layer 310 so that the light may be reduced or prevented from being partially concentrated.

The first light concentration layer 320 on the base substrate 301 may include a plurality of prism patterns 321. In the prism pattern 321, mountains and valleys may be repeated in a cross section, and may be adjacent to each other in a direction crossing a longitudinal direction of the glass diffuser 300 in a first direction X. The prism patterns 321 may protrude from the base substrate 301. The first light concentration layer 320 may concentrate or collect light passing through the glass diffuser 300.

Therefore, the light emitted from the plurality of LEDs 128a of the LED assembly 128 may be processed into uniform high-quality light in the process of passing through the glass diffuser 300, and then may be incident on the liquid crystal panel 110. The liquid crystal panel 110 may display an image having a high luminance on the outside thereof using the light.

In this case, a second light concentration layer (not shown) including prism patterns (not shown), which may protrude in a direction crossing the longitudinal direction of the glass diffuser 300 in a second direction Y, and which may be alternately and vertically arranged with the prism patterns 321 positioned on the first light concentration layer 320, may be further provided above the first light concentration layer 320 of the glass diffuser 300. In addition, a reflective polarizing film (not shown) may be further provided above the first light concentration layer 320. The light may be recycled by the reflective polarizing film, such that the luminance of light can be further improved. In this case, back edges of the liquid crystal panel 110 may be fixedly attached onto the glass diffuser 300 by a first adhesive member 180a (see FIG. 3) having the adhesive property.

The liquid crystal panel 110 and the backlight unit 120 may be integrally modularized using the main frame 200 and the bottom frame 150. The main frame 200 may have a rectangular frame shape, and may support back edges of the glass diffuser 300. An optical gap or an air gap between the LED assembly 128 and the glass diffuser 300 may be maintained by the main frame 200.

In the direct light type backlight unit 120 according to an example embodiment of the present disclosure, the optical gap or the air gap (hereinafter referred to as an "optical gap") may be between the LED assembly 128 and the glass diffuser 300. The optical gap may be a color mixing space of the lights emitted from the plurality of LEDs 128a of the LED assembly 128. The optical gap may uniformly color-mix the lights emitted from the plurality of LEDs 128a to be incident on the glass diffuser 300, or may reduce or prevent thermal expansion of the glass diffuser 300 caused by high temperature heat generated from the plurality of LEDs 128a.

To provide the optical gap, the main frame 200 may include a vertical portion 210 and a guide bar 220. A gap between the LED assembly 128 and the glass diffuser 300 may be maintained by the vertical portion 210. The guide bar 220 may protrude from an inner side of the vertical portion 210 to have a particular inclination. A path of light provided from the LED 128a may be changed by the guide bar 220. A lower end of the vertical portion 210 may have a first height form the lower surface 151 of the bottom frame 150 or the reflector 125, and a lower end of the guide bar 220 may have a second height form the lower surface 151 of the bottom frame 150 or the reflector 125. In this instance, the first height may be greater than the second height. The lower end of the guide bar 220 may contact a surface of the reflector 125.

The glass diffuser 300 may be fixedly attached onto the guide bar 220 by a second adhesive member 180b (of FIG. 3) having the adhesive property, so that the optical gap between the LED assembly 128 and the glass diffuser 300 may be maintained. The second adhesive member 180b (of FIG. 3), by which the glass diffuser 300 and the main frame 200 may be fixedly attached to each other, may have a wider width d2 (of FIG. 3) than the first adhesive member 180a (of FIG. 3), by which the liquid crystal panel 110 and the glass diffuser 300 may be fixedly attached to each other. Thus, the glass diffuser 300 and the main frame 200 may be more stably and fixedly attached to each other.

In the LCD device 100 according to an example embodiment of the present disclosure, a top frame 40 (see FIG. 1) may be removed, and the liquid crystal panel 110 and the backlight unit 120 may be modularized using only the main frame 200 and the bottom frame 150 to realize a narrow bezel. The main frame 200 may include a metal material to more stably support the liquid crystal panel 110 and the glass diffuser 300.

For example, because it is desirable for the main frame 200 to have a particular strength capable of withstanding the weight of the liquid crystal panel 110 and the glass diffuser 300 to stably support the liquid crystal panel 110 and the glass diffuser 300, the main frame 200 may be formed of the metal material. For example, the mainframe may be formed by extruding aluminum, although embodiments are not limited thereto.

The main frame 200, by which the liquid crystal panel 110 and the glass diffuser 300 may be stably and fixedly attached to each other, may accommodate the LED assembly 128, the reflector 125, and the like. The main frame 200 may be assembled and fastened with the bottom frame 150 that may cover the back surface of the backlight unit 120. Accordingly, the LCD device 100 according to an example embodiment of the present disclosure may be integrally modularized.

The bottom frame 150, on which the liquid crystal panel 110 and the backlight unit 120 may be mounted, and which may be a base for assembling the entirety of the components of the LCD device 100, may have the plate-shaped lower surface 151 and a side surface 153 vertically bent from an edge of the lower surface 151. In this case, the main frame 200 may be referred to as a "support main," a "main support," or a "mold frame," and the bottom frame 150 may be referred to as a "bottom cover" or a "lower cover."

In the above-described LCD device 100 according to an example embodiment of the present disclosure, the liquid crystal panel 110 and the backlight unit 120 may be integrally modularized using only the main frame 200 and the bottom frame 150, without the top frame 40 (of FIG. 1) of a metal material. Thus, characteristics of being lightweight, thin, and having a narrow bezel can be realized, and process costs can also be reduced.

Figure 3:
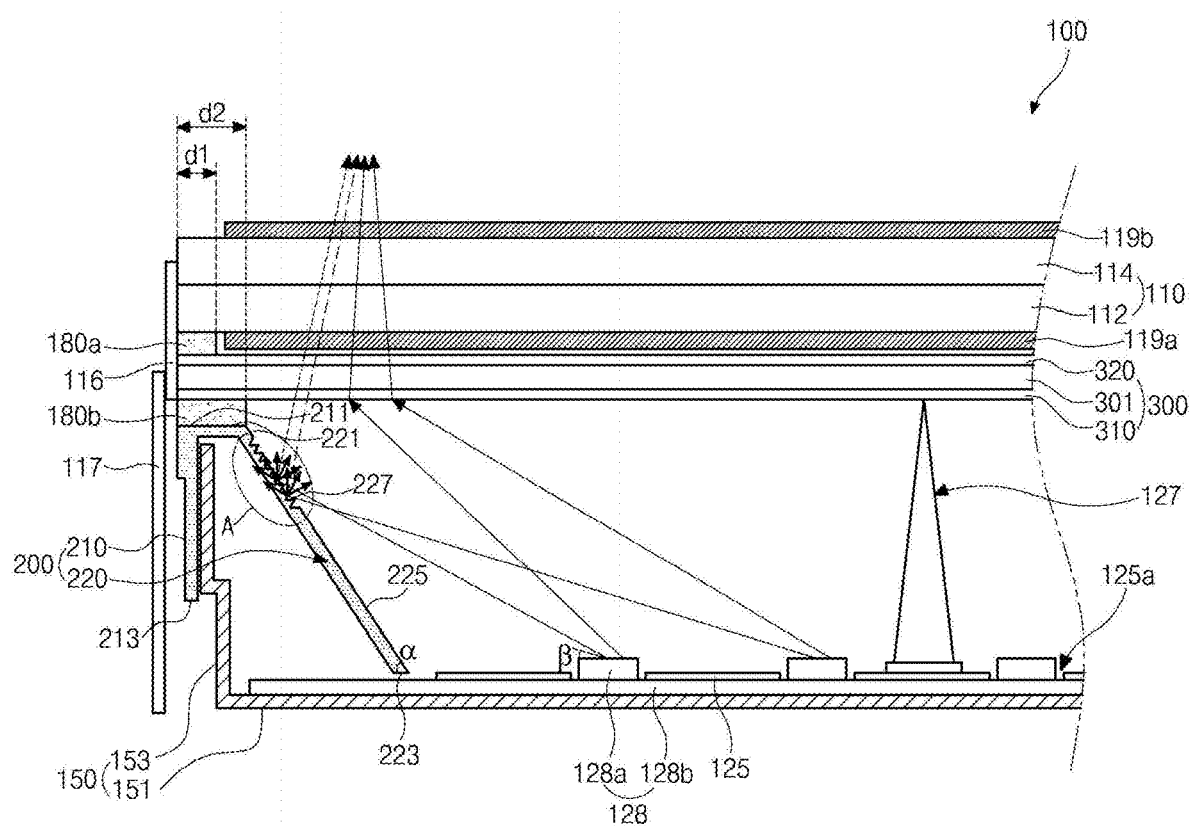
FIG. 3 is a cross-sectional view showing a modularized LCD device according to a first example embodiment of the present disclosure.

In addition, the liquid crystal panel 110 and the glass diffuser 300 may be fixedly attached to each other by the first adhesive member 180a (of FIG. 3), and the glass diffuser 300 and the main frame 200 may also be fixedly attached to each other by the second adhesive member 180b (of FIG. 3). Accordingly, a narrow bezel can be realized, and characteristics of being lightweight and thin can be realized.

For example, when the liquid crystal panel and the glass diffuser are fixed by the main frame, a separate structure for fixedly attaching the liquid crystal panel and the glass diffuser may be required in the main frame. However, in the LCD device 100 according to an example embodiment of the present disclosure, the main frame 200 may include only a structure for fixedly attaching only the glass diffuser 300. Thus, the structure of the main frame 200 can be simplified, and a narrow bezel can be realized using the structure. Characteristics of the main frame 200 of being lightweight and thin of can also be realized.

For example, the width d2 (of FIG. 3) of the second adhesive member 180b (of FIG. 3), by which the glass diffuser 300 and the main frame 200 may be fixedly attached to each other, may be greater (e.g., wider) than the width d1 (of FIG. 3) of the first adhesive member 180a (of FIG. 3), by which the liquid crystal panel 110 and the glass diffuser 300 may be fixedly attached to each other. Accordingly, a narrow bezel corresponding to the width d1 of the first adhesive member 180a can be realized, and the liquid crystal panel 110 and the backlight unit 120 can be more stably and integrally modularized.

The first and second adhesive members 180a and 180b may include an elastic resin, but embodiments are not limited thereto. For example, the first and second adhesive members 180a and 180b may include a foam pad, an optical clear adhesive (OCA), a double-sided tape, and/or the like.

First Embodiment

Figure 4A:
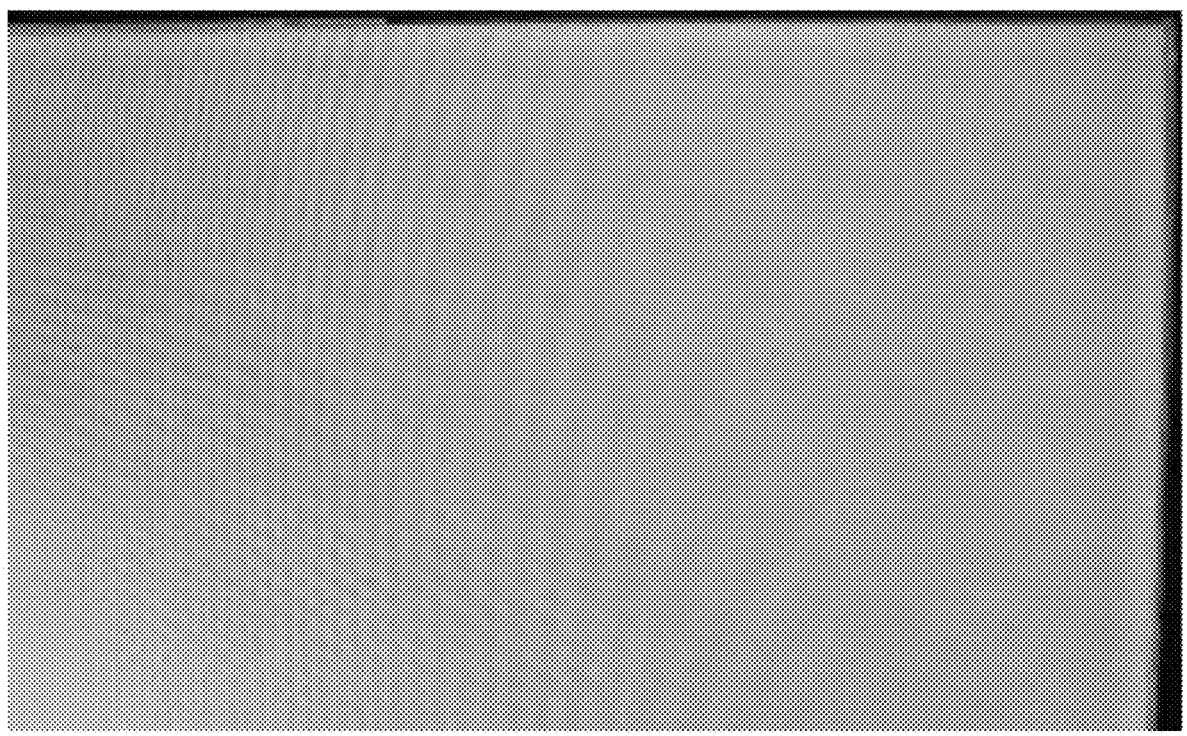
FIG. 4A is a photograph of an experimental result showing a state in which a light unevenness phenomenon occurs due to edge irregularity.
Figure 4B:
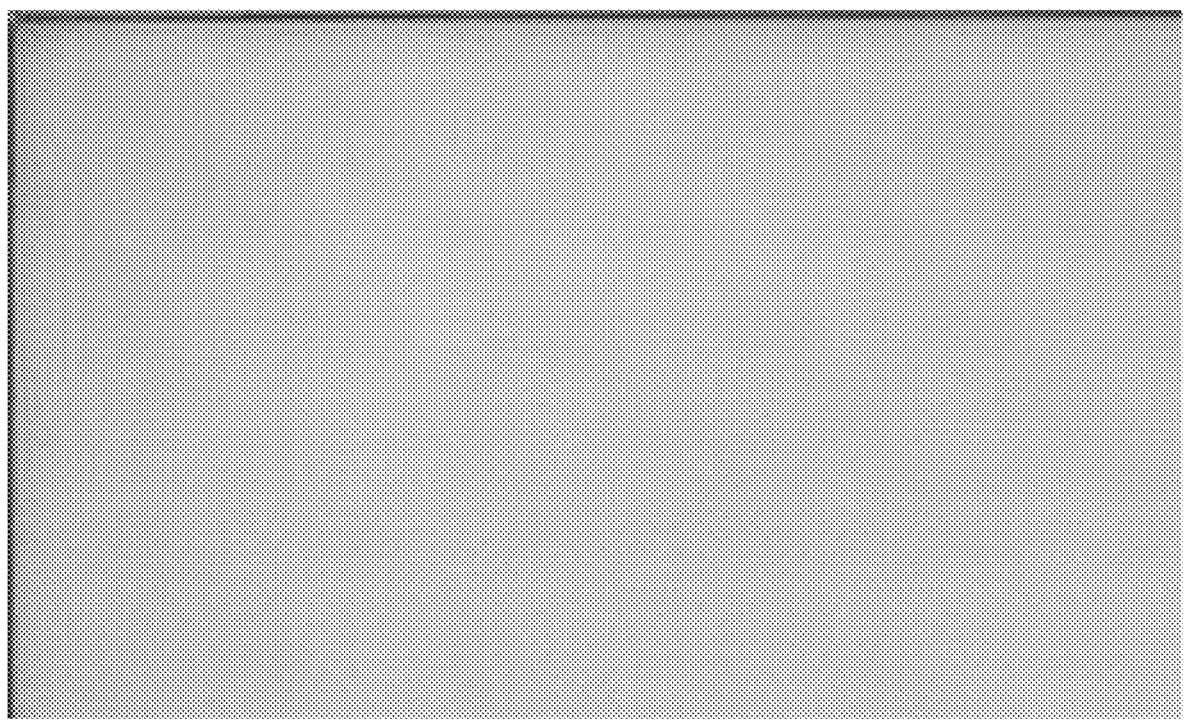
FIG. 4B is a photograph of an experimental result showing a state in which no edge irregularity occurs in the LCD device according to the first example embodiment of the present disclosure.

FIG. 3 is a cross-sectional view showing a modularized LCD device according to a first example embodiment of the present disclosure. FIG. 4A is a photograph of an experimental result showing a state in which a light unevenness phenomenon due to edge irregularity occurs. FIG. 4B is a photograph of an experimental result showing a state in which no edge irregularity occurs in the LCD device according to the first example embodiment of the present disclosure. FIGS. 5A to 5D are enlarged cross-sectional views showing a pattern portion of a guide bar.

The backlight unit 120 (of FIG. 2) may be provided by stacking an LED assembly 128, which may include a plate-shaped PCB 128b and a plurality of LEDs 128a mounted on the PCB 128b, a reflector 125, which may expose only the plurality of LEDs 128a of the LED assembly 128 through through-holes 125a, and a glass diffuser 300 on the LED assembly 128. The liquid crystal panel 110 including a first substrate 112, a second substrate 114, and a liquid crystal layer (not shown) between the first and second substrates 112 and 114 may be above the backlight unit 120. Polarizers 119a and 119b, through which only specific light may be selectively transmitted, may be respectively attached to outer surfaces of the first and second substrates 112 and 114.

In the liquid crystal panel 110 according to the first example embodiment of the present disclosure, the first substrate 112 and the second substrate 114 may have the same shape, such that one end of each of the first substrate 112 and the second substrate 114 may coincide with each other. Side surfaces of pads (not shown), which may be at respective ends of a plurality of lines (not shown) on the first substrate 112, may be exposed at a side surface between the first substrate 112 and the second substrate 114.

A PCB 117 may be connected to one side of the liquid crystal panel 110, e.g., through a connecting member 116. In this case, the connecting member 116 may be attached to a side surface of the liquid crystal panel 110 and connected thereto. The backlight unit 120 and the liquid crystal panel 110 may be integrally modularized using a bottom frame 150 and a main frame 200.

The LED assembly 128 may be mounted on a lower surface 151 of the bottom frame 150, and a reflector 125 may be above the LED assembly 128, and may expose only the plurality of LEDs 128a of the LED assembly 128 through the through-holes 125a. The glass diffuser 300 may be above the LED assembly 128 with a particular gap (distance) therebetween. In this case, the glass diffuser 300 may be supported by a guide support 127.

Edges of the backlight unit 120 including the LED assembly 128 and the reflector 125 may be surrounded by the main frame 200. The main frame 200 may include a vertical portion 210, including an upper surface 211 having a particular thickness, and a guide bar 220 protruding from an inner side of the vertical portion 210.

The guide bar 220 may include an upper surface 221 extending from the upper surface 211 of the vertical portion 210, and an inclined surface 225, which may form an obtuse angle with the upper surface 221 and may be steadily inclined toward a lower surface 223 facing a lower surface 213 of the vertical portion 210. For example, the inclined surface 225 of the guide bar 220 may be inclined from the upper surface 221 toward the lower surface 151 of the bottom frame 150. A lower end of the vertical portion 210 may have a first height form the lower surface 151 of the bottom frame 150, and a lower end of the guide bar 220 may have a second height form the lower surface 151 of the bottom frame 150. In this instance, the first height may be smaller than the second height.

The inclined surface 225 extending from the upper surface 221 of the guide bar 220 may have an angle α formed with the lower surface 151 of the bottom frame 150, which satisfies the following Expression 1.

$$\beta < \alpha < 90°$$ [Expression 1]

In this case, 'β' is an angle (e.g., a beam angle) between the lower surface 151 of the bottom frame 150 and a light emitting region of light emitted from the LED 128a, and refers to a dark portion region on the lower surface 151 of the bottom frame 150, in which the light emitted from the LED 128a may not substantially extend. Therefore, an angle α formed by the inclined surface 225 of the guide bar 220 with the lower surface 151 of the bottom frame 150 should be greater than an angle β between the lower surface 151 of the bottom frame 150 and the light emitting region of the LED 128a, and should be smaller than 90°.

For example, the inclined surface 225 may guide the light provided from the LED 128a only when the angle α between the inclined surface 225 and the lower surface 151 of the bottom frame 150 is greater than the angle β between the lower surface 151 of the bottom frame 150 and the light emitting region of the LED 128a. Thus, the inclined surface 225 may be inclined at an angle satisfying the condition of Expression 1 described above.

In this case, when the angle α between the inclined surface 225 and the lower surface 151 of the bottom frame 150 is greater than 90°, the light emitted from the LED 128a may be reflected toward the reflector 125, without being directed toward the liquid crystal panel 110. Thus, there is an upper limit value of the angle α between the inclined surface 225 and the lower surface 151 of the bottom frame 150.

A side surface 153 of the bottom frame 150 may be between the vertical portion 210 of the main frame 200 and the inclined surface 225 of the main frame 200, and an inner side surface of the vertical portion 210 of the main frame 200 may closely contact an outer side surface of the side surface 153 of the bottom frame 150. Thus, the main frame 200 and the bottom frame 150 may be assembled and fastened to each other.

A portion of a back edge of the glass diffuser 300 may be supported by the upper surface 211 of the vertical portion 210 and the upper surface 221 of the guide bar 220, and the glass diffuser 300 may be positioned above the main frame 200. In this case, a second adhesive member 180b may be between the glass diffuser 300 and the upper surface 211 of the vertical portion 210, and may be between the glass diffuser 300 and the upper surface 221 of the guide bar 220, so that the glass diffuser 300 may be fixedly attached to the main frame 200.

The back edge of the glass diffuser 300 may be mounted on and supported by the upper surface 211 and the upper surface 221 of the main frame 200. Thus, the glass diffuser 300 and the plurality of LEDs 128a of the LED assembly 128 may be spaced a particular distance from each other by the main frame 200 and the guide support 127. Therefore, an optical gap may be maintained.

A portion of a back edge of the liquid crystal panel 110 may be supported by and positioned above the glass diffuser 300. A first adhesive member 180a may be between the glass diffuser 300 and the liquid crystal panel 110 so that the glass diffuser 300 and the liquid crystal panel 110 may be fixedly attached to each other. Therefore, the liquid crystal panel 110 and the backlight unit 120, including the glass diffuser 300, may be integrally modularized using the main frame 200, the bottom frame 150 and the first and second adhesive members 180a and 180b.

For example, the glass diffuser 300 and the liquid crystal panel 110 may be fixedly attached to the main frame 200, and the bottom frame 150 and the main frame 200 may be assembled and fastened to each other such that the LED assembly 128 and the reflector 125 may be mounted on the bottom frame 150. Accordingly, the liquid crystal panel 110 and the backlight unit 120 may be integrally modularized. In this case, because the width d2 of the second adhesive member 180b is greater than the width d1 of the first adhesive member 180a, the glass diffuser 300 and the liquid crystal panel 110 may be more stably and fixedly attached to the main frame 200.

The width d1 of the first adhesive member 180a for fixedly attaching the glass diffuser 300 and the liquid crystal panel 110 may form a bezel region of the LCD device 100. Therefore, a narrow bezel can be well-realized as the width d1 of the first adhesive member 180a is reduced.

When the width d1 of the first adhesive member 180a is too small, adhesion and fixing force between the glass diffuser 300 and the liquid crystal panel 110 may become weak. However, in the LCD device 100, because the glass diffuser 300, which may be attached to the liquid crystal panel 110 by the first adhesive member 180a, and the main frame 200 are fixedly attached to each other by the second adhesive member 180b having the width d2 wider than the width d1 of the first adhesive member 180a, the glass diffuser 300 and the liquid crystal panel 110 may be stably and fixedly attached to each other, even when the width d1 of the first adhesive member 180a is small. For example, in the LCD device 100, a narrow bezel can be realized, and the LCD device 100 can be more stably and integrally modularized. Furthermore, in the LCD device 100 according to the first example embodiment of the present disclosure, a pattern portion 227 may be on the inclined surface 225 of the guide bar 220 of the main frame 200.

In a process of changing paths of the light emitted from the plurality of LEDs 128a of the LED assembly 128 by the inclined surface 225 of the main frame 200 and uniformly supplying the light to the edge region of the liquid crystal panel 110, the light reflected by a region A of the inclined surface 225 of the main frame 200 may be mixed with the light directly supplied from the plurality of LEDs 128a to the liquid crystal panel 110. As a result, a problem of light concentration on the edge region of the liquid crystal panel 110 may occur.

The region A of the inclined surface 225 is a region closest to the liquid crystal panel 110 among three regions into which the inclined surface 225 may be divided to have the same width. Accordingly, light leakage occurs along the edge region of the liquid crystal panel 110 due to light being incident on the region A of the inclined surface 225 and reflected, as shown in the example of FIG. 4A, and a light non-uniformity problem may occur due to the light leakage in the edge region.

Therefore, in the LCD device 100 according to the first example embodiment of the present disclosure, the pattern portion 227 may be on the region A of the inclined surface 225 of the main frame 200 so that the light incident on the region A of the inclined surface 225 may be scattered and diffused. Accordingly, the light incident on the region A of the inclined surface 225 may not be mixed with the light directly supplied from the plurality of LEDs 128a to the liquid crystal panel 110. Thus, an occurrence of the light concentration on the edge region of the liquid crystal panel 110 can be reduced or prevented as shown in the example of FIG. 4B. Therefore, an occurrence of light non-uniformity problem can be reduced or prevented.

Figure 5A:
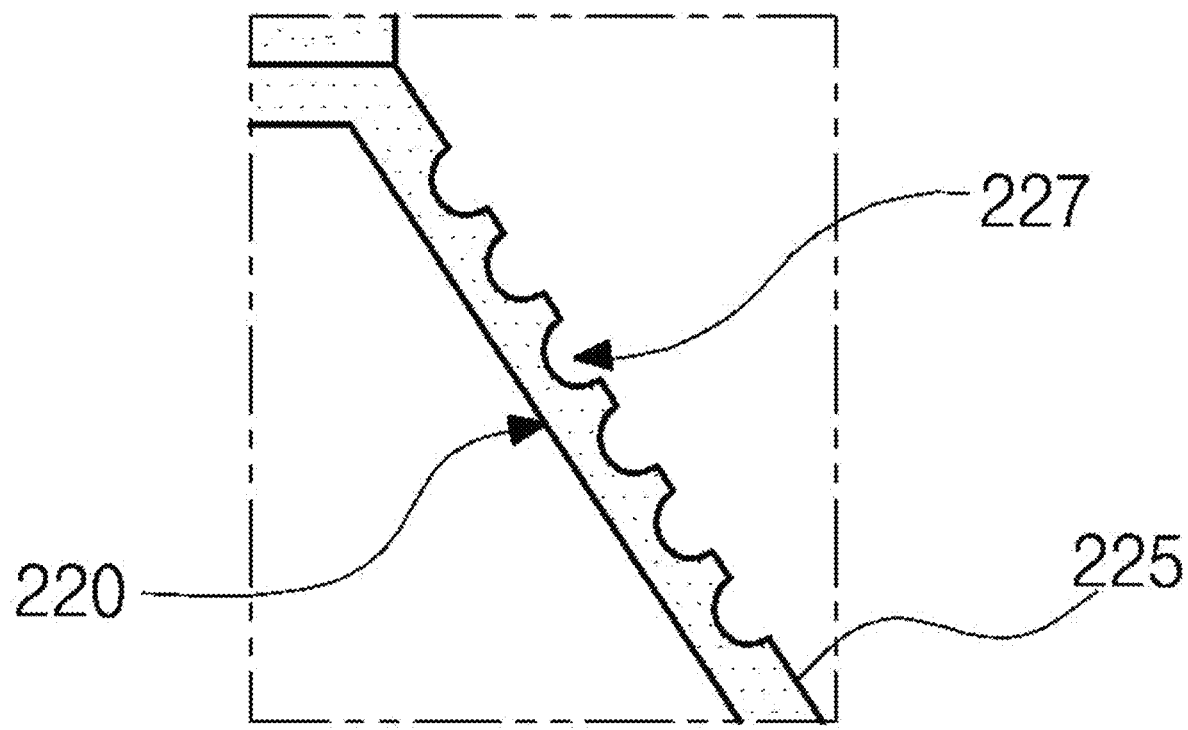
FIGS. 5A to 5D are enlarged cross-sectional views showing a pattern portion of a guide bar.
Figure 5B:
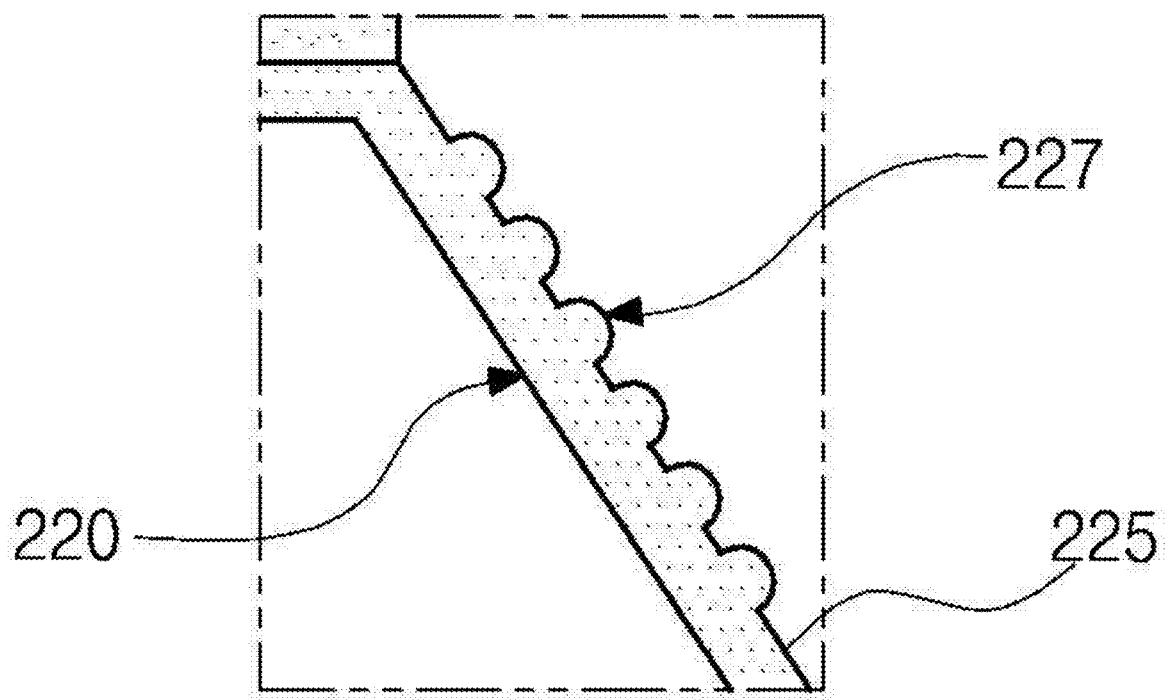
Figure 5C:
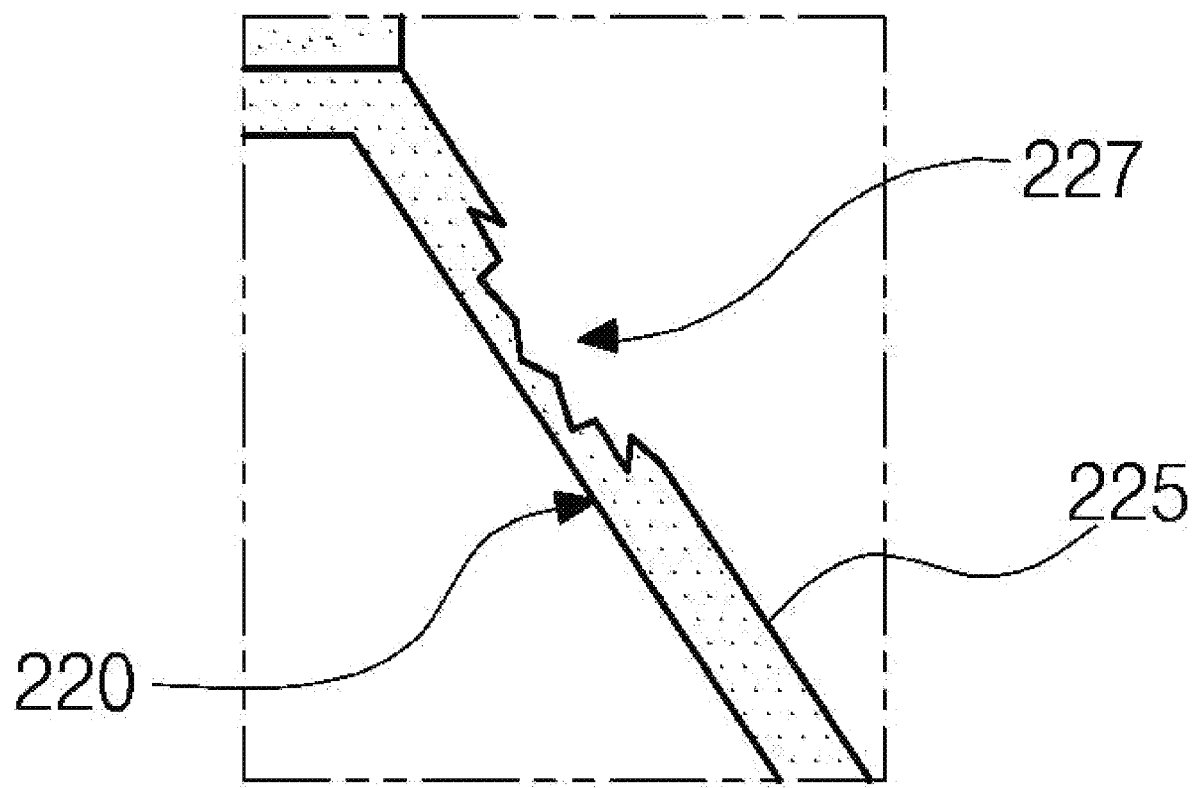

As shown in the example of FIG. 5A, the pattern portion 227 may be have a semicircular and concave engraved-shape. As shown in the example of FIG. 5B, the pattern portion 227 may have a semicircular and convex embossed-shape. Although not shown, the pattern portion 227 may be have various shapes, such as an elliptical shape, a polygonal shape, and/or the like. In addition, the pattern portion 227 may use a hologram shape to refract light incident by an interference pattern in an asymmetrical direction with the incident direction so that the collected light may be diffused at a further inclined angle.

Figure 5D:
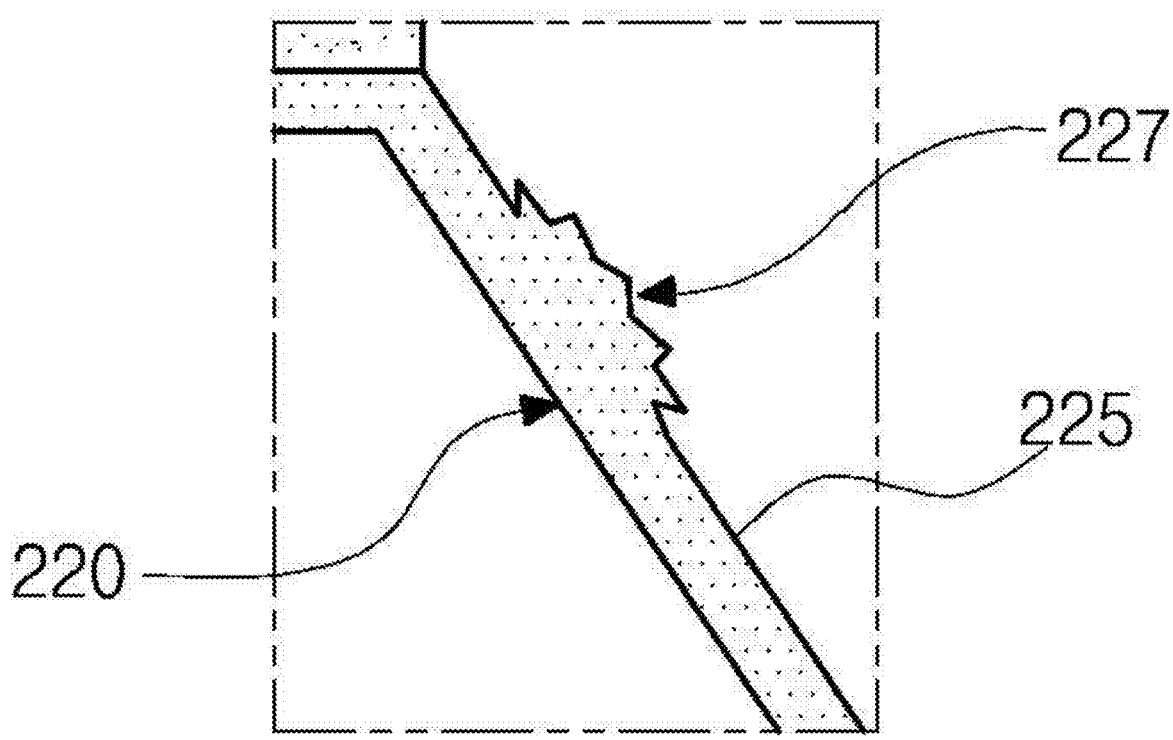

As shown in the example of FIG. 5A, the pattern portion 227 may be provided such that a shape and a size of a pattern having a concave engraved-shape are not uniform. As shown in the example of FIG. 5D, the pattern portion 227 may be provided such that a shape and a size of a pattern having a convex embossed-shape are not uniform. As described above, when the shape of the pattern of the pattern portion 227 is not uniform, the light scattering and diffusion effects may be increased or maximized.

Further, although not shown, the pattern portion 227 may be provided on the entire inclined surface 225. In this case, the pattern portion 227 may be densely provided per unit area by being closer to the liquid crystal panel 110. Thus, a large amount of light may be scattered and diffused among the light incident on the inclined surface 225 by being closer to the liquid crystal panel 110. For example, the patterns on the inclined surface 225 may have a first density at a region closer to the upper surface 221, and a second density, smaller than the first density, at a region closer to the lower surface 223.

As described above, in the LCD device 100 according to the first example embodiment of the present disclosure, the pattern portion 227 may be on the inclined surface 225 of the main frame 200 so that an occurrence of the light concentration on the edge region of the liquid crystal panel 110 can be reduced or prevented. Therefore, an occurrence of light non-uniformity in the edge region can be reduced or prevented.

Second Embodiment

Figure 6A:
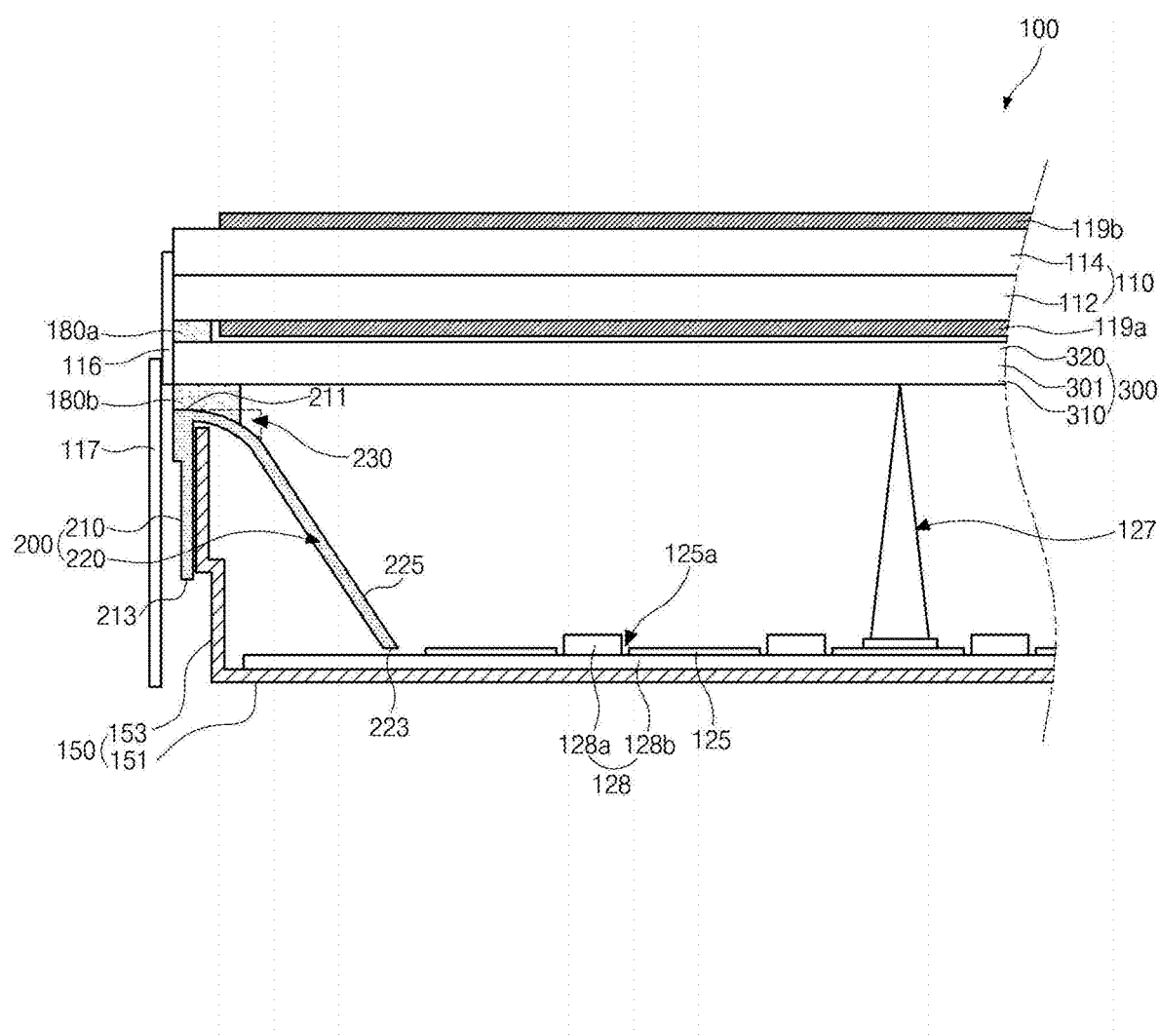
FIG. 6A is a cross-sectional view showing a modularized LCD device according to a second example embodiment of the present disclosure.
Figure 6B:
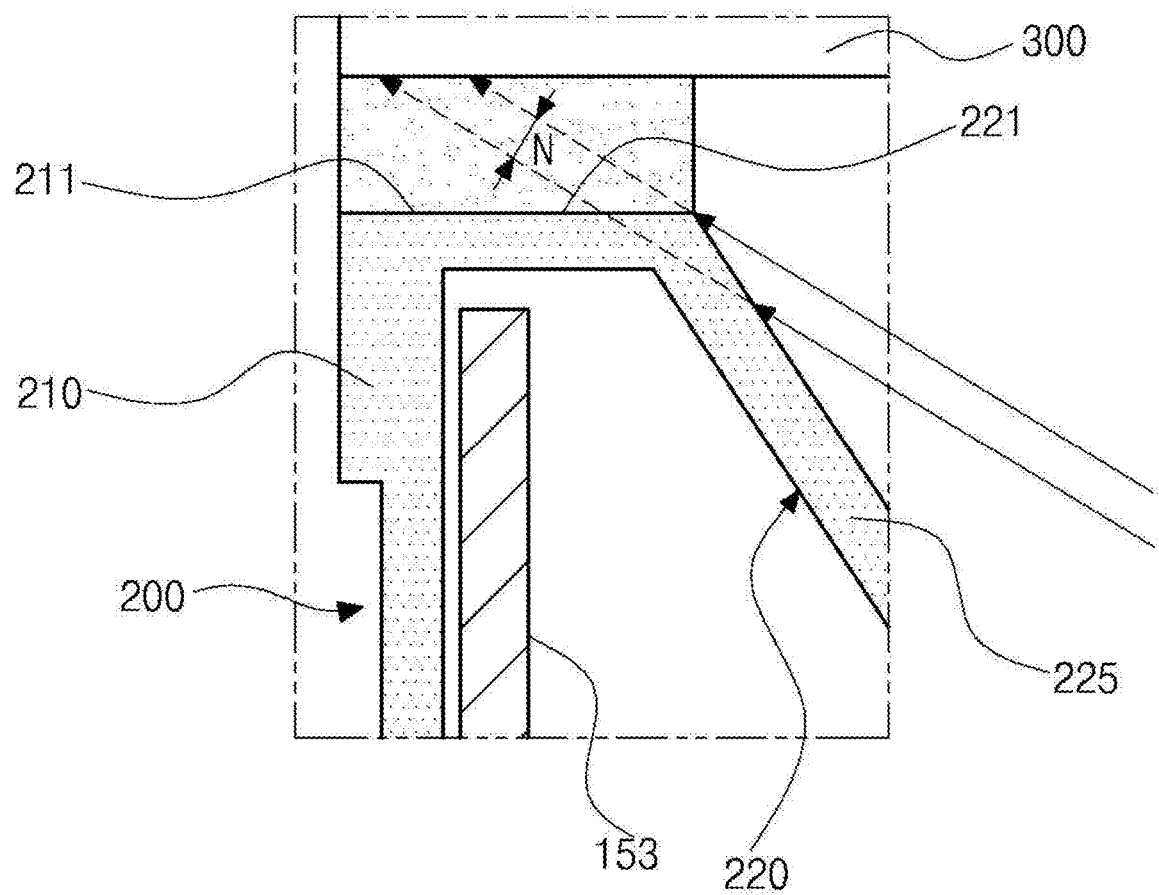
FIG. 6B is a cross-sectional view showing a state in which a dark portion is generated in an edge region of a liquid crystal panel.
Figure 6C:
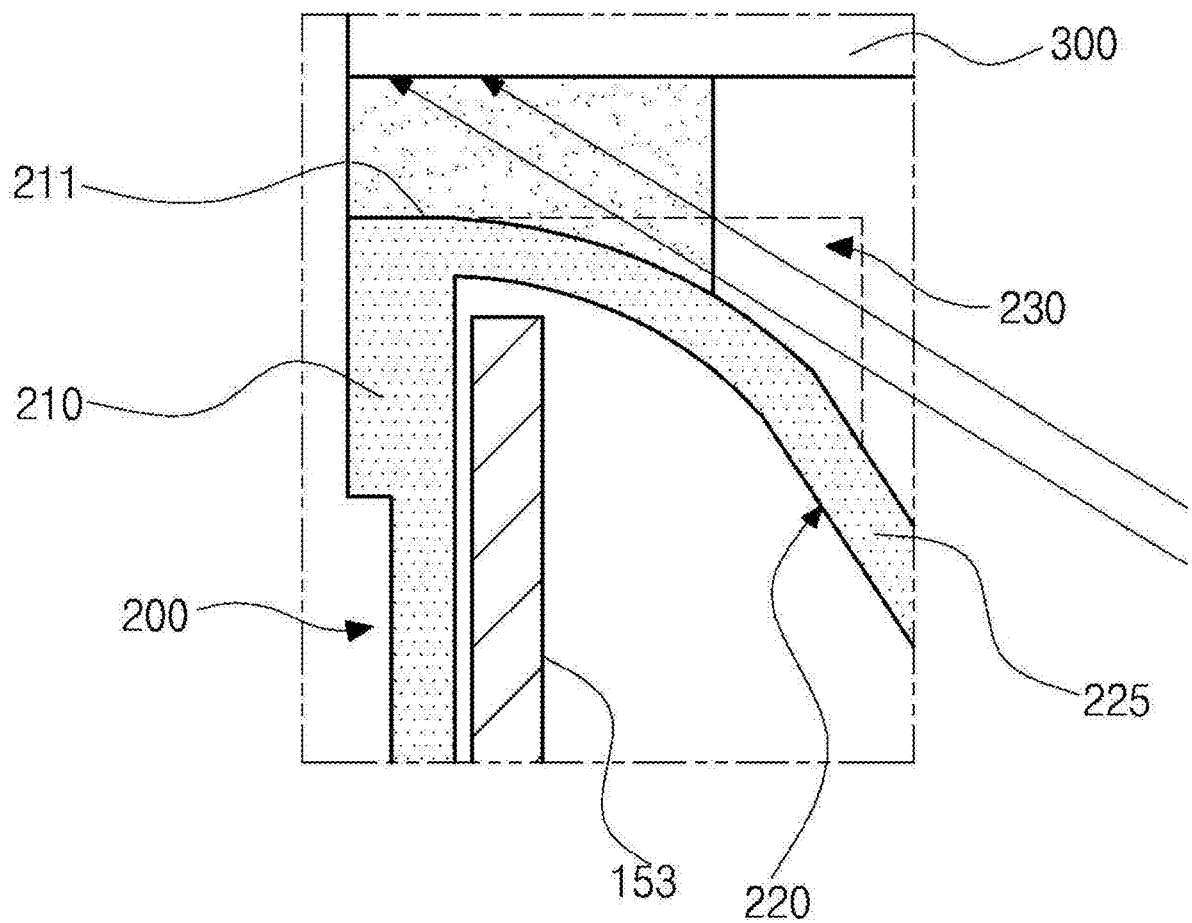
FIG. 6C is a cross-sectional view showing a state in which no dark portion is generated in the edge region of the liquid crystal panel of the modularized LCD device according to the second example embodiment of the present disclosure.

FIG. 6A is a cross-sectional view showing a modularized LCD device according to a second example embodiment of the present disclosure. FIG. 6B is a cross-sectional view showing a state in which a dark portion is generated in an edge region of a liquid crystal panel. FIG. 6C is a cross-sectional view showing a state in which no dark portion is generated in the edge region of the liquid crystal panel of the modularized LCD device according to the second example embodiment of the present disclosure.

Figure 7A:
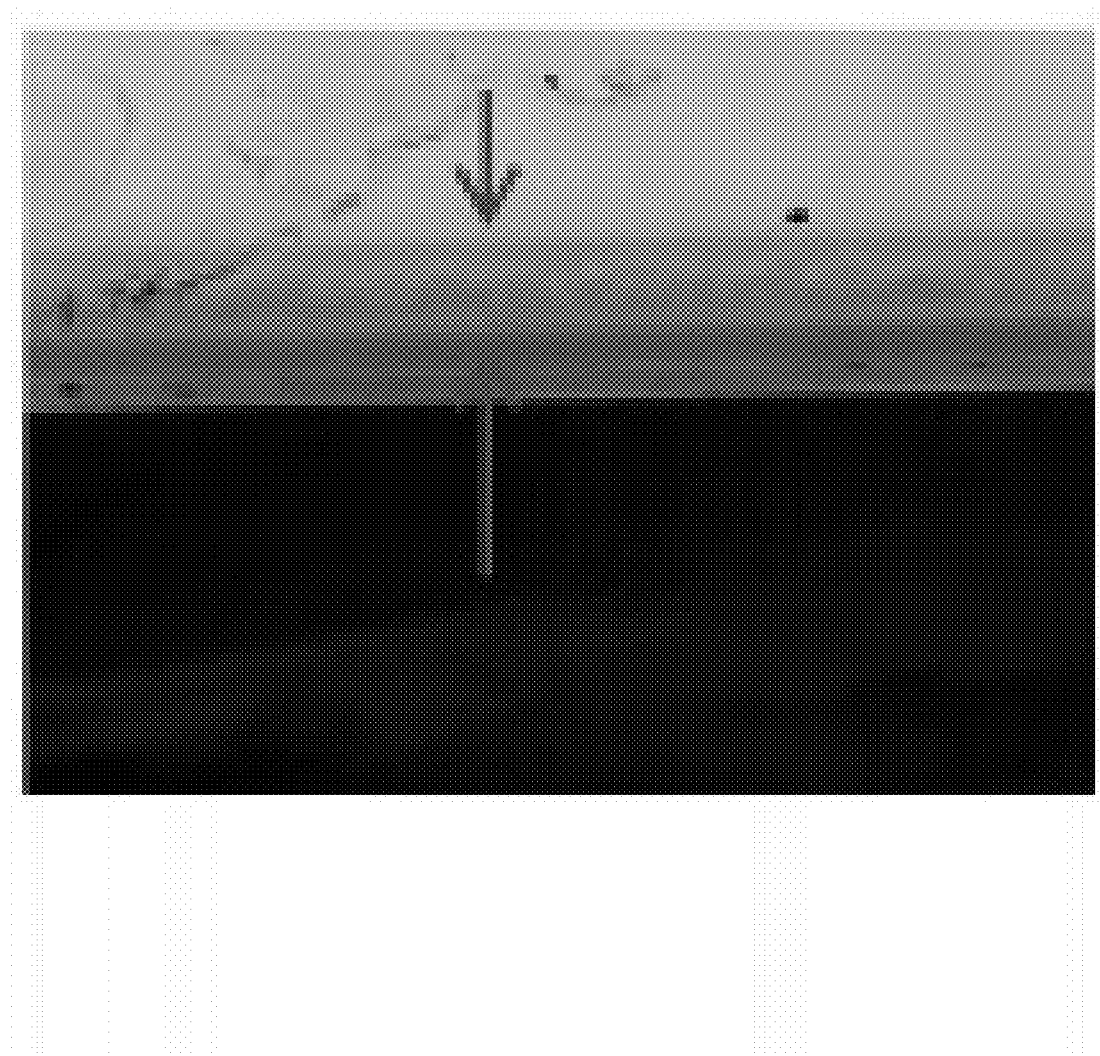
FIG. 7A is a photograph of an experimental result showing a state in which a dark portion is generated in the edge region of the liquid crystal panel.
Figure 7B:
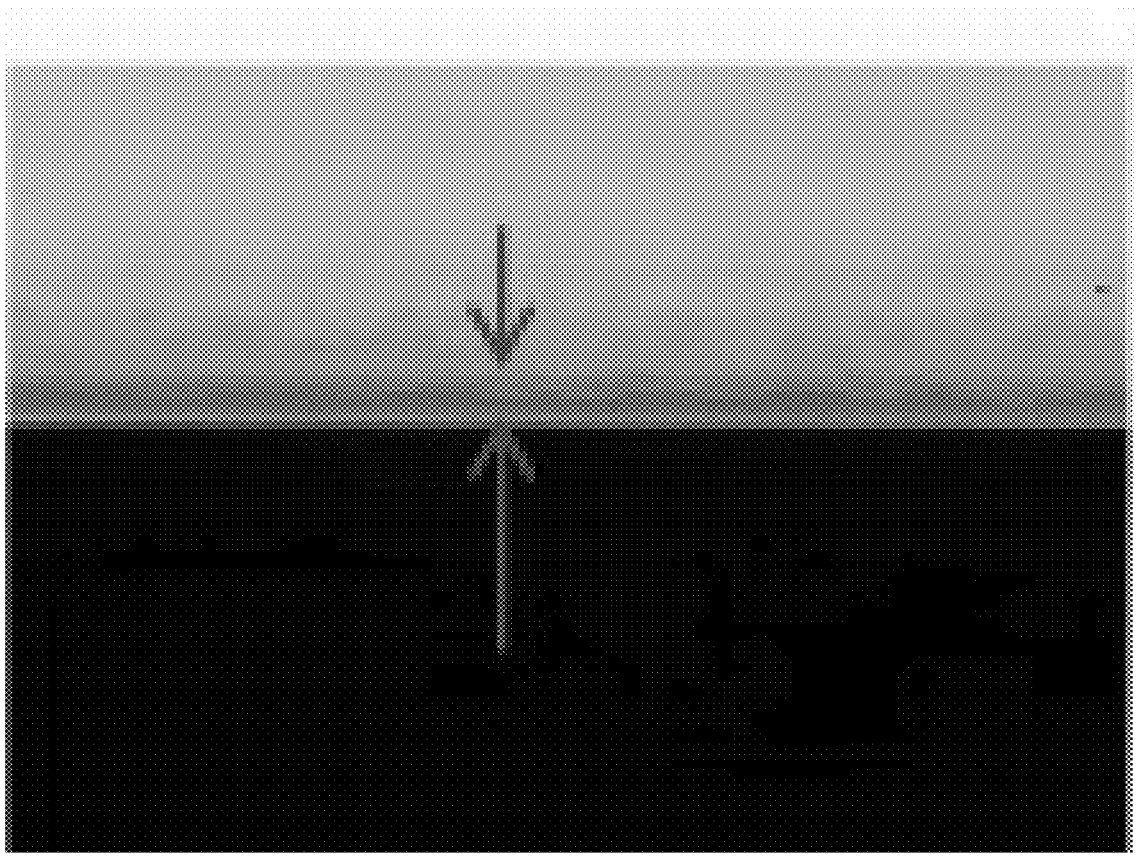
FIG. 7B is a photograph of an experimental result showing a state in which no dark portion is generated in the edge region of the liquid crystal panel of the LCD device according to the second example embodiment of the present disclosure.
Figure 8:
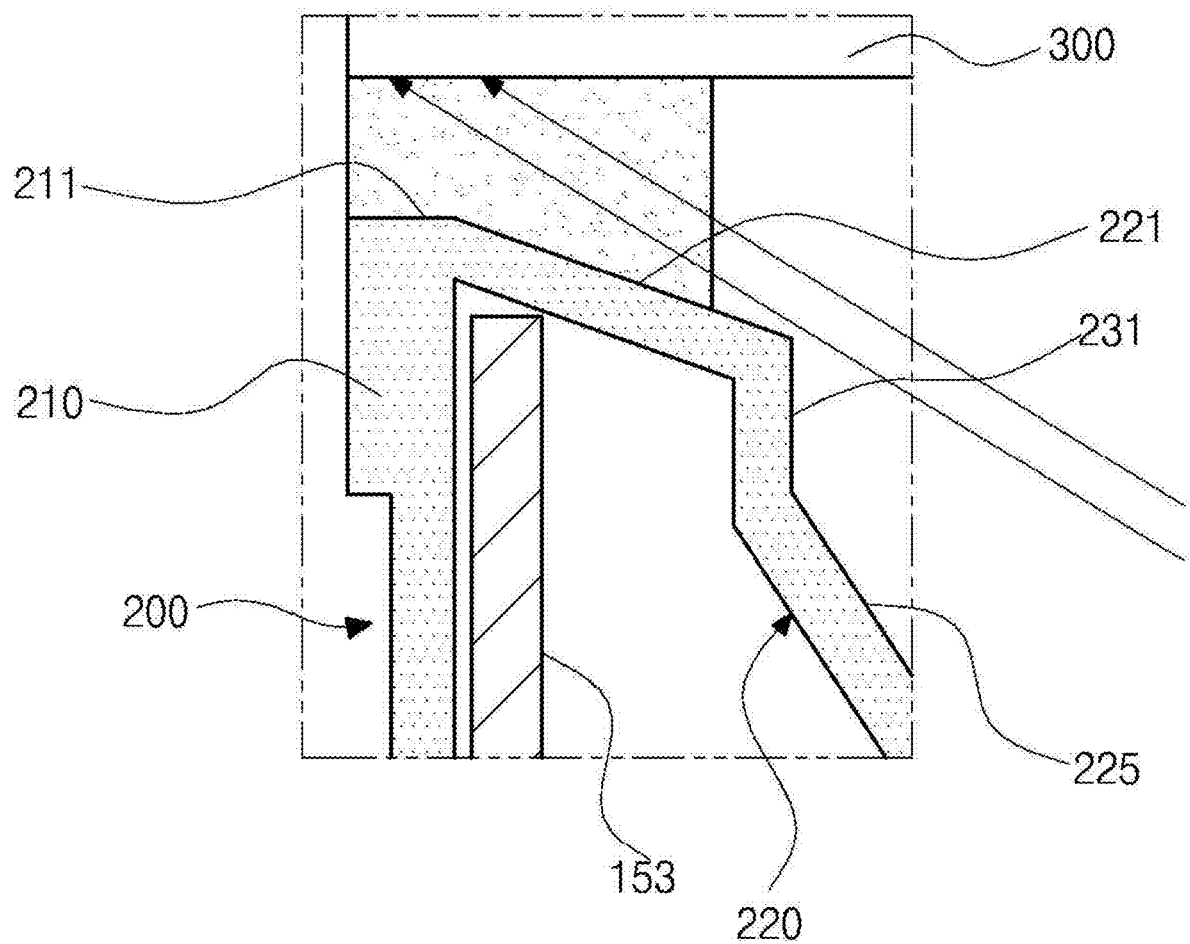
FIG. 8 is a cross-sectional view showing another example of a main frame of the LCD device according to the second example embodiment of the present disclosure.

FIG. 7A is a photograph of an experimental result showing a state in which the dark portion is generated in the edge region of the liquid crystal panel. FIG. 7B is a photograph of an experimental result showing a state in which no dark portion is generated in the edge region of the liquid crystal panel of the LCD device according to the second example embodiment of the present disclosure. FIG. 8 is a cross-sectional view showing another example of a main frame of the LCD device according to the second example embodiment of the present disclosure.

To avoid redundant description, the same portions as those of the first embodiment described above are denoted by the same reference numerals, and only the characteristic contents to be described in the second example embodiment will be described in detail.

As shown in the example of FIG. 6A, the backlight unit 120 (of FIG. 2) may be provided by stacking an LED assembly 128, which may include a plate-shaped PCB 128b and a plurality of LEDs 128a mounted on the PCB 128b, a reflector 125, which may expose only the plurality of LEDs 128a of the LED assembly 128 through through-holes 125a, and a glass diffuser 300 on the LED assembly 128. The liquid crystal panel 110, including a first substrate 112, a second substrate 114, and a liquid crystal layer (not shown) between the first and second substrates 112 and 114, may be above the backlight unit 120. Polarizers 119a and 119b, through which only particular light may be selectively transmitted, may be respectively attached to outer surfaces of the first and second substrates 112 and 114.

A PCB 117 may be connected to one side of the liquid crystal panel 110 through a connecting member 116. In this case, the connecting member 116 may be attached to a side surface of the liquid crystal panel 110 and connected thereto.

The backlight unit 120 and the liquid crystal panel 110 may be integrally modularized using a bottom frame 150 and a main frame 200. The LED assembly 128 may be mounted on a lower surface 151 of the bottom frame 150, and a reflector 125 may be above the LED assembly 128 to expose only the plurality of LEDs 128a of the LED assembly 128 through the through-holes 125a.

The glass diffuser 300 may be above the LED assembly 128 with a particular gap (distance) therebetween. In this case, the glass diffuser 300 may be supported by a guide support 127.

Edges of the backlight unit 120 including the LED assembly 128 and the reflector 125 may be surrounded by the main frame 200. The main frame 200 may include a vertical portion 210 including an upper surface 211 having a particular thickness and a guide bar 220 protruding from an inner side of the vertical portion 210.

The guide bar 220 may include an inclined surface 225, which may form an obtuse angle with the upper surface 211 of the vertical portion 210, and may be steadily inclined toward a lower surface 223 facing a lower surface 213 of the vertical portion 210. For example, the inclined surface 225 of the guide bar 220 may be inclined from the upper surface 211 toward the lower surface 151 of the bottom frame 150.

In the LCD device 100 according to the second example embodiment of the present disclosure, a chamfer portion 230 may be on the guide bar 220 of the main frame 200. A portion of a corner formed by the upper surface 221 (of FIG. 6B) extending from the upper surface 211 of the vertical portion 210 and the inclined surface 225 may be removed or cut to form the chamfer portion 230. The main frame 200 may be formed by directly protruding the inclined surface 225 of the guide bar 220 from the upper surface 211 of the vertical portion 210 through the chamfer portion 230.

In this case, the corner formed between the vertical portion 210 and the upper surface 211 and the corner formed between the upper surface 211 and the inclined surface 225 may be curved. For example, the corner of the upper surface 211 may have a curved shape.

A side surface 153 of the bottom frame 150 may be between the vertical portion 210 of the main frame 200 and the inclined surface 225 of the main frame 200, and an inner side surface of the vertical portion 210 of the main frame 200 may closely contact an outer side surface of the side surface 153 of the bottom frame 150. Thus, the main frame 200 and the bottom frame 150 may be assembled and fastened to each other.

A portion of a back edge of the glass diffuser 300 may be supported by the upper surface 211 of the vertical portion 210 and the upper surface 221 of the guide bar 220, and the glass diffuser 300 may be above the main frame 200. In this case, a second adhesive member 180b may be between the glass diffuser 300 and the upper surface 211 of the vertical portion 210, and may be between the glass diffuser 300 and the inclined surface 225 of the guide bar 220 so that the glass diffuser 300 may be fixedly attached to the main frame 200.

Here, the back edge of the glass diffuser 300 may be mounted on and supported by the upper surface 211 of the main frame 200 and the inclined surface 225 so that the glass diffuser 300 and the plurality of LEDs 128a of the LED assembly 128 may be spaced a particular interval from each other by the main frame 200 and the guide support 127. Thus, an optical gap may be maintained.

A portion of a back edge of the liquid crystal panel 110 may be supported by and positioned above the glass diffuser 300. A first adhesive member 180a may be between the glass diffuser 300 and the liquid crystal panel 110 so that the glass diffuser 300 and the liquid crystal panel 110 may be fixedly attached to each other. Therefore, the liquid crystal panel 110 and the backlight unit 120 including the glass diffuser 300 may be integrally modularized using the main frame 200, the bottom frame 150, and the first and second adhesive members 180a and 180b.

Meanwhile, in the LCD device 100 according to the second example embodiment of the present disclosure, the chamfer portion 230 may be above the guide bar 220 of the main frame 200. Accordingly, in the LCD device 100 according to the second example embodiment of the present disclosure, generation of a dark portion in the edge region of the liquid crystal panel 110 may be reduced or minimized.

With reference to the example of FIG. 6B, a region N, in which light does not reach the second adhesive member 180b, may be generated due to the upper surface 211 of the main frame 200. As described above, the region N may be directly connected to the liquid crystal panel 110 so that a dark portion, in which light does not reach along the edge region of the liquid crystal panel 110, may be generated. Therefore, a dark portion may be generated along the edge of the liquid crystal panel 110, as shown in the example of FIG. 7A.

In the LCD device 100 according to the second example embodiment of the present disclosure, the chamfer portion 230 may be above the guide bar 220 of the main frame 200. Thus, generation of a region, in which light does not reach the second adhesive member 180b, may be reduced or prevented, as shown in the example of FIG. 6C. Accordingly, generation of a dark portion along the edge region of the liquid crystal panel 110 can be reduced or prevented, as shown in the example of FIG. 7B.

The corner formed between the vertical portion 210 and the upper surface 211, and the corner formed between the upper surface 211 and the inclined surface 225, may have a curved shape. In this case, the light may more easily reach the second adhesive member 180b, such that the generation of the dark portion along the edge region of the liquid crystal panel 110 can be reduced or prevented.

As shown in the example of FIG. 8, the upper surface 221 of the main frame 200, which may extend from the upper surface 211, may be inclined at a particular angle to form an obtuse angle with the inclined surface 225. Also, the main frame 200 may further include a right angle portion 231, which may be parallel to the vertical portion 210, between the upper surface 221 and the inclined surface 225.

The upper surface 221 of the main frame 200 may be inclined. Thus, generation of a region, in which light does not reach the second adhesive member 180b, may be reduced or prevented. In this case, the corner formed between the vertical portion 210 and the upper surface 211 and the corner formed between the upper surface 221 and the inclined surface 225 may be curved, and the right angle portion 231 may be omitted.

As described above, in the LCD device 100 according to the second example embodiment of the present disclosure, the chamfer portion 230 may be above the guide bar 220 of the main frame 200, and the corner formed between the vertical portion 210 of the main frame 200 and the upper surface 211, and the corner formed between the upper surface 211 and the inclined surface 225, may be curved. As a result, generation of the dark portion along the edge region of the liquid crystal panel 110 can be reduced or prevented, and the light non-uniformity by the light leakage can be reduced or prevented.

Meanwhile, the dark portion of the edge region of the liquid crystal panel 110 may be outside the light leakage occurring along the edge region of the liquid crystal panel 110 in the first example embodiment. Therefore, when the light leakage occurs along the edge region of the liquid crystal panel 110 by the inclined surface 225 of the main frame 200, visibility may be increased due to a contrast difference between the dark portion of the edge region of the liquid crystal panel 110, which may be generated by the light not reaching the second adhesive member 180b, and the light leakage, which may be caused by the inclined surface 225 of the main frame 200. Thus, a light non-uniformity by the light leakage may become larger.

Therefore, when the LCD device 100 is formed by applying both of the first example embodiment and the second example embodiment of the present disclosure thereto, an occurrence of the light concentration on the edge region of the liquid crystal panel 110 can be reduced or prevented. Also, an occurrence of the light non-uniformity can be reduced or prevented.

Third Embodiment

Figure 9A:
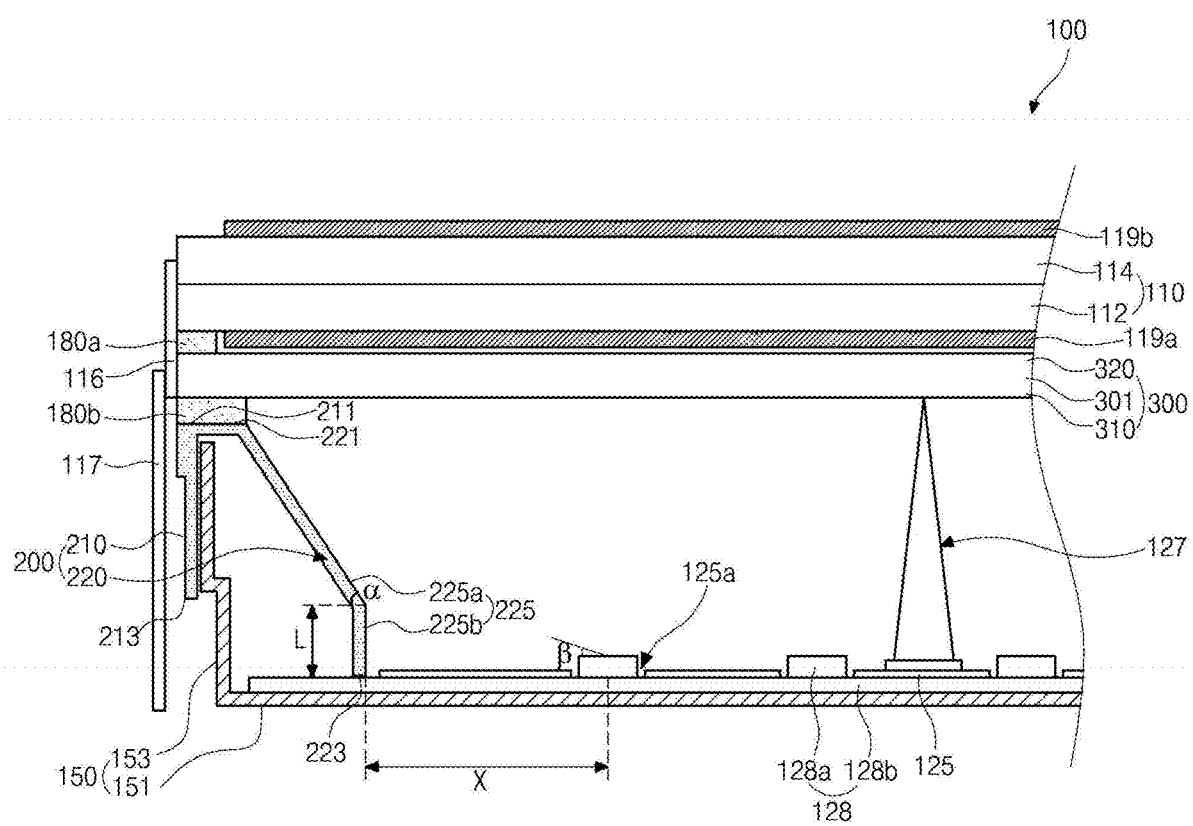
FIG. 9A is a cross-sectional view showing a modularized LCD device according to a third example embodiment of the present disclosure.
Figure 9B:
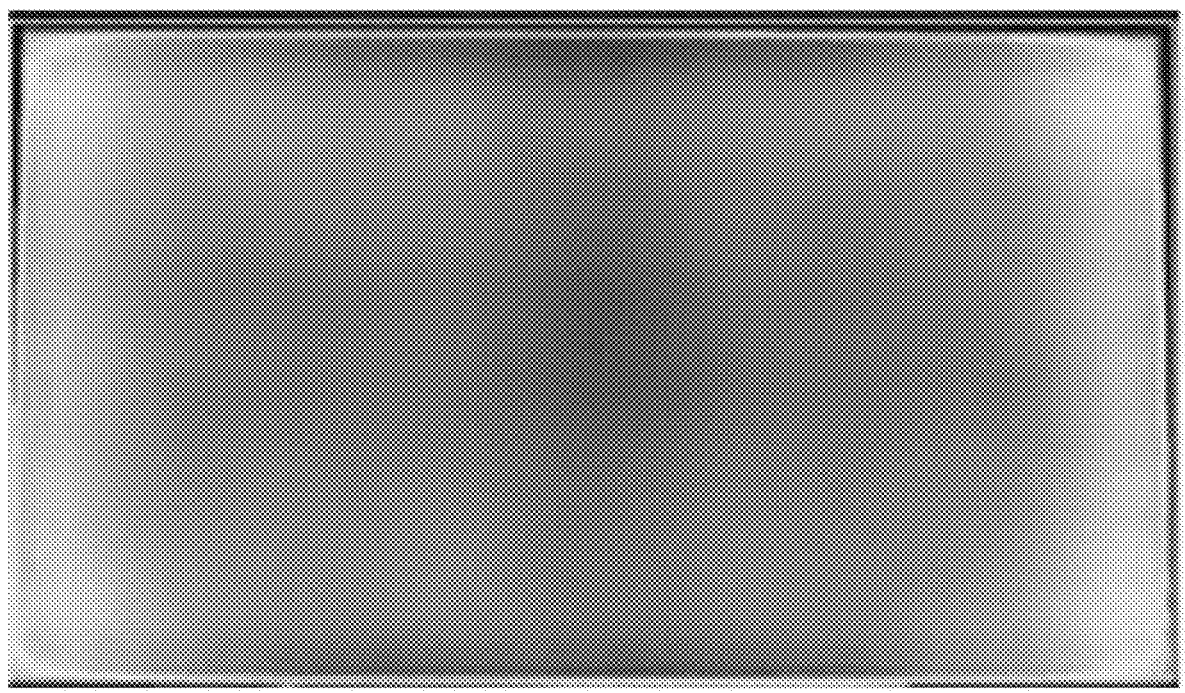
FIG. 9B is a photograph of an experimental result showing a state in which a wave mura phenomenon occurs by a guide bar of a main frame.
Figure 9C:
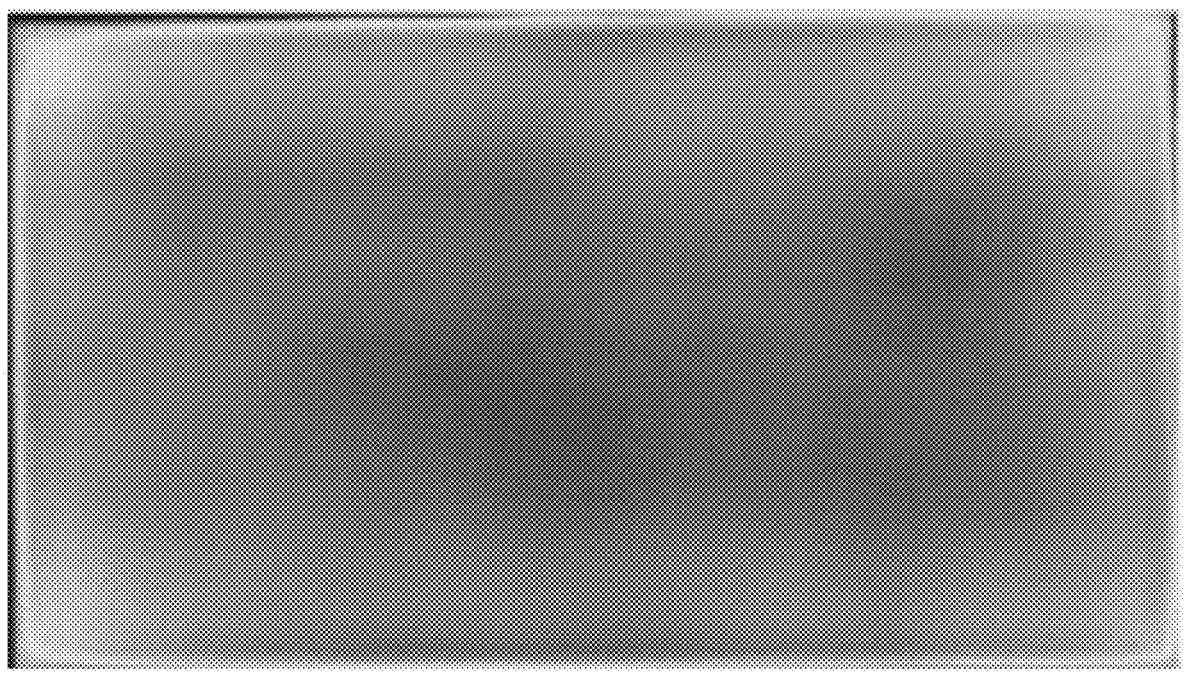
FIG. 9C is a photograph of an experimental result showing a state in which no wave mura phenomenon occurs in an edge region of a liquid crystal panel of the modularized LCD device according to the third example embodiment of the present disclosure.

FIG. 9A is a cross-sectional view showing a modularized LCD device according to a third example embodiment of the present disclosure. FIG. 9B is a photograph of an experimental result showing a state in which a wave mura phenomenon occurs by a guide bar of a main frame. FIG. 9C is a photograph of an experimental result showing a state in which no wave mura phenomenon occurs in an edge region of a liquid crystal panel of the modularized LCD device according to the third example embodiment of the present disclosure.

Figure 10A:
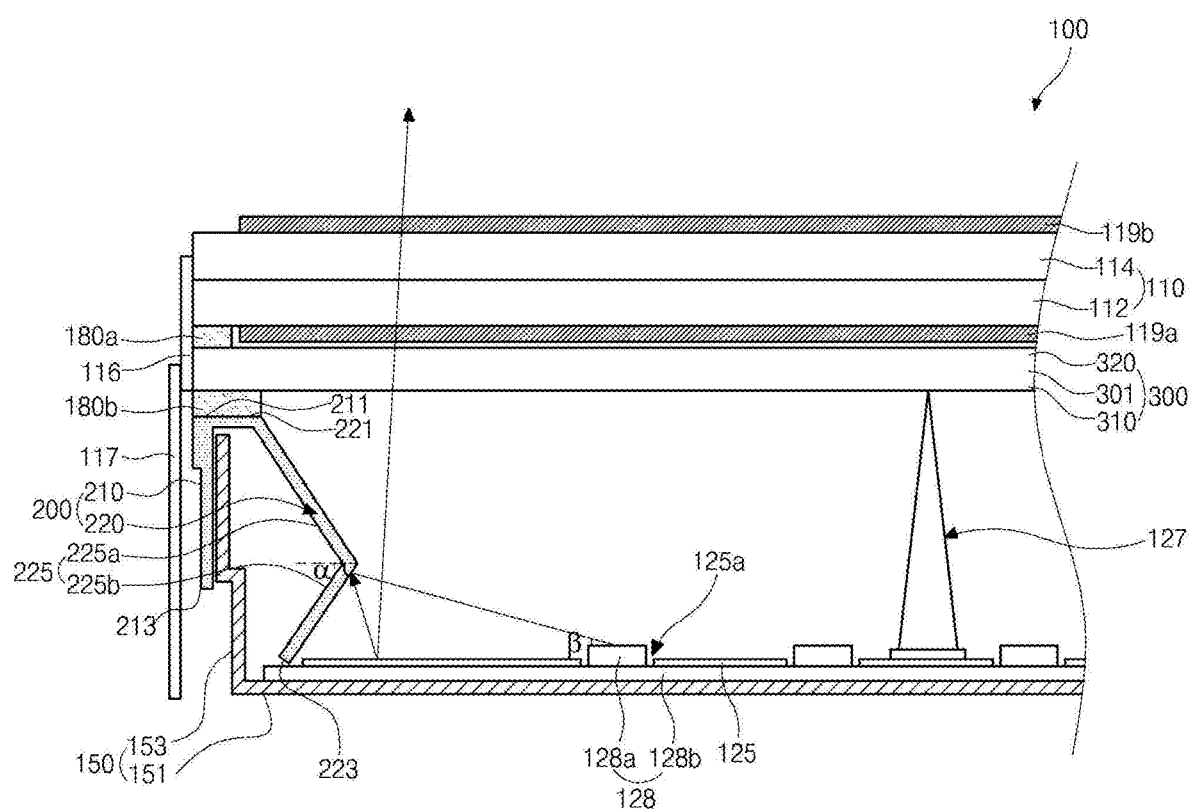
FIG. 10A is a cross-sectional view showing another example of a main frame of the LCD device according to the third example embodiment of the present disclosure.
Figure 10B:
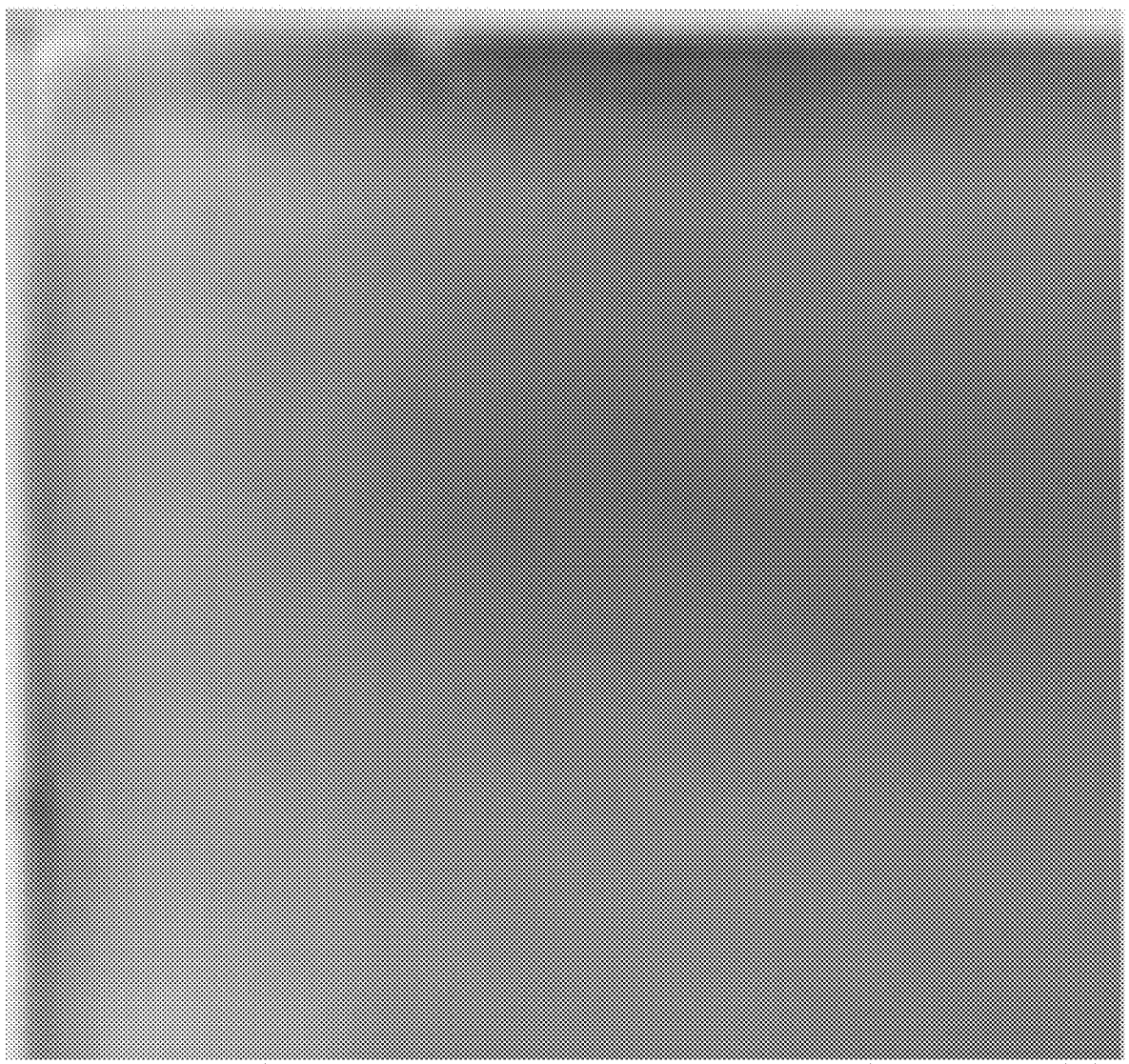
FIG. 10B is a photograph of an experimental result showing a state in which a dark portion is generated in the edge region of the liquid crystal panel.
Figure 10C:
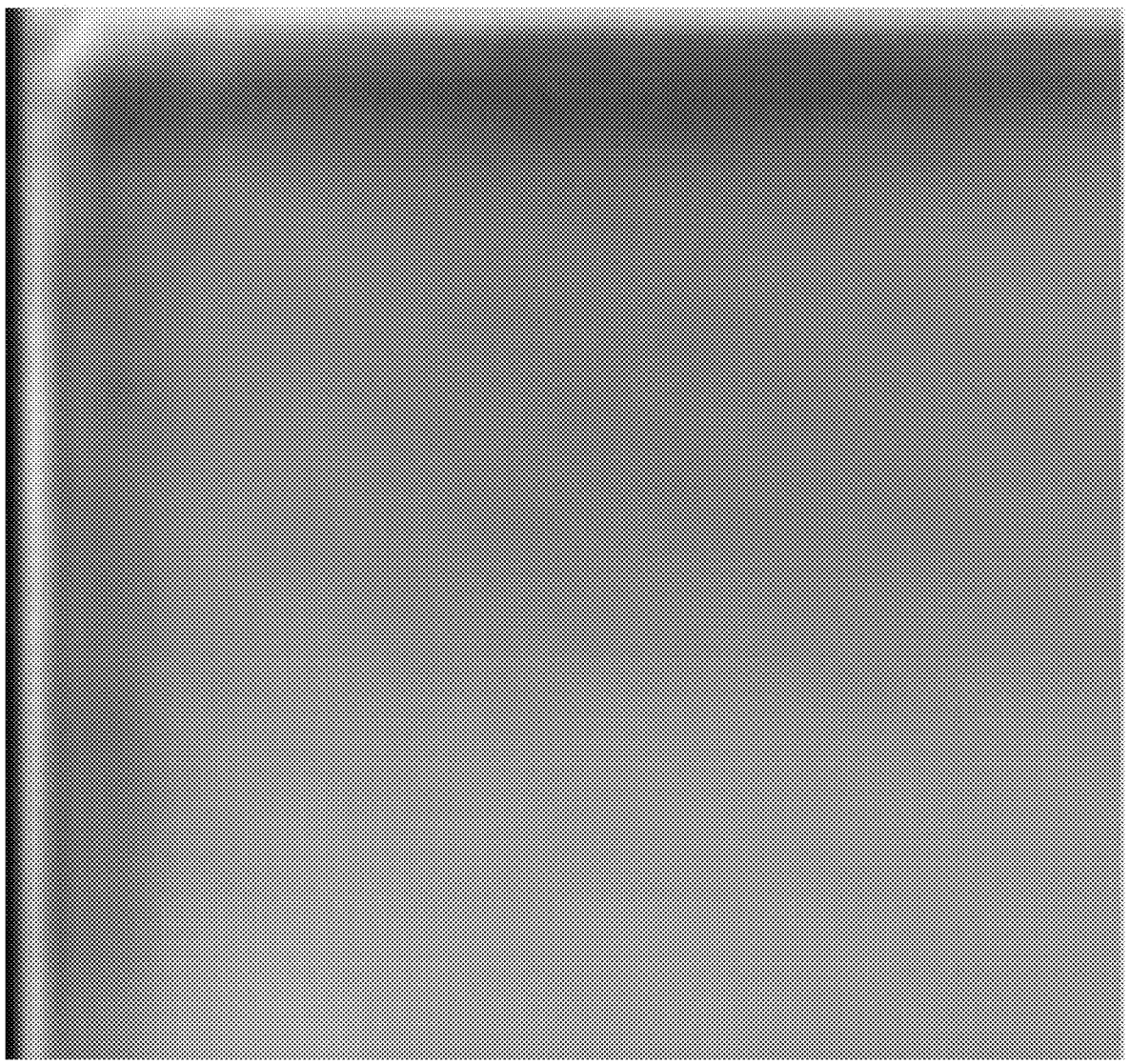
FIG. 10C is a photograph of an experimental result showing a state in which no dark portion is generated in the edge region of the liquid crystal panel of the LCD device according to the third example embodiment of the present disclosure, which may include the main frame of FIG. 10A.

FIG. 10A is a cross-sectional view showing another example of a main frame of the LCD device according to the third example embodiment of the present disclosure. FIG. 10B is a photograph of an experimental result showing a state in which a dark portion is generated in the edge region of the liquid crystal panel. FIG. 10C is a photograph of an experimental result showing a state in which no dark portion is generated in the edge region of the liquid crystal panel of the LCD device according to the third example embodiment of the present disclosure which may include the main frame of FIG. 10A.

To avoid redundant description, the same portions as those of the first and second embodiments described above are denoted by the same reference numerals, and only the characteristic contents to be described in the third example embodiment will be described in detail.

As shown in the example of FIG. 9A, the backlight unit 120 (of FIG. 2) may be provided by stacking an LED assembly 128, which may include a plate-shaped PCB 128b and a plurality of LEDs 128a mounted on the PCB 128b, a reflector 125, which may expose only the plurality of LEDs 128a of the LED assembly 128 through through-holes 125a, and a glass diffuser 300 on the LED assembly 128. The liquid crystal panel 110, including a first substrate 112, a second substrate 114, and a liquid crystal layer (not shown) between the first and second substrates 112 and 114, may be above the backlight unit 120. Polarizers 119a and 119b, through which only particular light may be selectively transmitted, may be respectively attached to outer surfaces of the first and second substrates 112 and 114.

A PCB 117 may be connected to one side of the liquid crystal panel 110, e.g., through a connecting member 116. In this case, the connecting member 116 may be attached to a side surface of the liquid crystal panel 110 and connected thereto.

The backlight unit 120 and the liquid crystal panel 110 may be integrally modularized using a bottom frame 150 and a main frame 200. The LED assembly 128 may be mounted on a lower surface 151 of the bottom frame 150, and a reflector 125 may be above the LED assembly 128 to expose only the plurality of LEDs 128a of the LED assembly 128 through the through-holes 125a.

The glass diffuser 300 may be above the LED assembly 128 with a particular gap (distance) therebetween. In this case, the glass diffuser 300 may be supported by a guide support 127.

Edges of the backlight unit 120 including the LED assembly 128 and the reflector 125 may be surrounded by the main frame 200. The main frame 200 may include a vertical portion 210, including an upper surface 211 having a particular thickness, and a guide bar 220 protruding from an inner side of the vertical portion 210. The guide bar 220 may include an upper surface 221, which may extend from the upper surface 211 of the vertical portion 210, and an inclined surface 225, which may form an obtuse angle with the upper surface 221, and which may extend toward the lower surface 151 of the bottom frame 150.

A side surface 153 of the bottom frame 150 may be between the vertical portion 210 of the main frame 200 and the inclined surface 225 of the main frame 200, and an inner side surface of the vertical portion 210 of the main frame 200 may closely contact an outer side surface of the side surface 153 of the bottom frame 150. Thus, the main frame 200 and the bottom frame 150 may be assembled and fastened to each other.

A portion of a back edge of the glass diffuser 300 may be supported by the upper surface 211 of the vertical portion 210 and the upper surface 221 of the guide bar 220, and the glass diffuser 300 may be above the main frame 200. In this case, a second adhesive member 180b may be between the glass diffuser 300 and the upper surface 211 of the vertical portion 210 and between the glass diffuser 300 and the upper surface 221 of the guide bar 220 so that the glass diffuser 300 may be fixedly attached to the main frame 200.

The back edge of the glass diffuser 300 may be mounted on and supported by the upper surface 211 and the upper surface 221 of the main frame 200 so that the glass diffuser 300 and the plurality of LEDs 128a of the LED assembly 128 may be spaced a particular distance from each other by the main frame 200 and the guide support 127. Thus, an optical gap may be maintained.

A portion of a back edge of the liquid crystal panel 110 may be supported by and positioned above the glass diffuser 300. A first adhesive member 180a may be between the glass diffuser 300 and the liquid crystal panel 110 so that the glass diffuser 300 and the liquid crystal panel 110 may be fixedly attached to each other. Therefore, the liquid crystal panel 110 and the backlight unit 120 including the glass diffuser 300 may be integrally modularized using the main frame 200, the bottom frame 150, and the first and second adhesive members 180a and 180b.

Meanwhile, in the LCD device 100 according to the third example embodiment of the present disclosure, the inclined surface 225 of the main frame 200 may include a first inclined surface 225a and a second inclined surface 225b. The first inclined surface 225a and the second inclined surface 225b may have different angles. A contact portion between the first inclined surface 225a and the second inclined surface 225b may be disposed between the bottom frame 150 and the glass diffuser 300 to be closer to the bottom frame 150. In addition, a height of the contact portion between the first inclined surface 225a and the second inclined surface 225b from the bottom frame 150 may be greater than a height of the LED 128a from the bottom frame 150.

The first inclined surface 225a extending from the upper surface 221 may have an angle α formed with the lower surface 151 of the bottom frame 150 that satisfies Expression 1 described above.

For example, the angle α between the first inclined surface 225a and the lower surface 151 of the bottom frame 150 should be greater than an angle β between the lower surface 151 of the bottom frame 150 and the light emitting region of the LED 128a. The first inclined surface 225a may change a path of light provided from the LED 128a only when the angle α is greater than 90°. Thus, the first inclined surface 225a may be inclined at an angle satisfying the condition of Expression 1 described above.

In this case, when the angle α between the first inclined surface 225a and the lower surface 151 of the bottom frame 150 is greater than 90°, the light emitted from the LED 128a may be reflected toward the bottom frame 150, without being directed toward the liquid crystal panel 110. Thus, there is an upper limit value of the angle α between the first inclined surface 225a and the lower surface 151 of the bottom frame 150.

A height L of the second inclined surface 225b, which may extend from the first inclined surface 225a to form the lower surface 223, may satisfy a condition of the following Expression 2.

$$L = X \tan \beta + b,$$ [Expression 2]

where 0 mm<b<3 mm

In this case, 'X' is a distance between the second inclined surface 225b and a center of the LED 128a, and 'X tan β' is a height at which light may pass through an upper portion of the bottom frame 150 at a distance 'X' at which the LED 128a is spaced from the second inclined surface 225b. Therefore, the second inclined surface 225b may be longer by a particular length 'b' than the height at which light may pass through the upper portion of the bottom frame 150 at the distance 'X' from the LED 128a, as shown in Expression 2. In this case, when a value of 'b' is set to 3 mm or more, an amount of light provided to a region between the second inclined surface 225b and the LED 128a may be reduced, and a dark portion may be visually recognized through the region.

The second inclined surface 225b may be parallel to the vertical portion 210 of the main frame 200, as shown in the example of FIG. 9A. When the second inclined surface 225b of the guide bar 220 is parallel to the vertical portion 210, as described above, the second inclined surface 225b, which the light emitted from the LED 128a does not reach, may not be visually recognized in front of an image, so that an occurrence of a wave mura phenomenon, in which a boundary between the dark portion and a bright portion appears as a wave, can be reduced or prevented.

That is, FIG. 9B is a photograph of an experimental result showing a state in which a wave mura phenomenon occurs by the guide bar 220 of the main frame 200. It can be confirmed that the dark portion due to the region of the main frame 200, which the light does not reach, may be generated along the edge of the liquid crystal panel 110, and it can be confirmed that the boundary with the bright portion may be clearly recognized by the dark portion.

On the other hand, with reference to the example of FIG. 9C, the second inclined surface 225b of the guide bar 220 of the main frame 200 may be parallel to the vertical portion 210 so that the second inclined surface 225b of the main frame 200 may not be visible in a forward direction in which the image of the liquid crystal panel 110 may be implemented. Therefore, it can be confirmed that the dark portion may not be seen. Accordingly, it can be confirmed that no wave mura phenomenon may occur at the boundary between the dark portion and the bright portion.

Further, the second inclined surface 225b may be inclined at a particular angle from the first inclined surface 225a toward the vertical portion 210, as shown in the example of FIG. 10A. In this case, the second inclined surface 225b may have an angle α' formed with the first inclined surface 225a to satisfy the following Expression 3.

$$\beta < \alpha' < 90°$$ [Expression 3]

In this case, 'β' is an angle (e.g., a beam angle) between the lower surface 151 of the bottom frame 150 and a light emitting region of the light emitted from the LED 128a, and refers to a dark portion region on the lower surface 151 of the bottom frame 150, in which the light emitted from the LED 128a may not substantially extend. Therefore, as shown in Expression 3, the angle α' between the second inclined surface 225b and the first inclined surface 225a should be greater than an angle between the lower surface 151 of the bottom frame 150 and the light emitting region of the LED 128a.

As described above, the angle α' between the second inclined surface 225b and the first inclined surface 225a satisfies a condition of Expression 3. Thus, the light emitted from the LED 128a of the LED assembly 128 may be reflected by the second inclined surface 225b toward the reflector 125, and then may be re-reflected toward the glass diffuser 300 by the reflector 125. Therefore, the dark portion due to the region of the main frame 200, which the light may not reach, can be reduced or prevented from being generated along the edge of the liquid crystal panel 110.

Here, when the angle α' between the second inclined surface 225b and the first inclined surface 225a is smaller than the angle β between the lower surface 151 of the bottom frame 150 and the light emitting region of the LED 128a, the light reflected by the second inclined surface 225b may be directed toward an inner side of the first inclined surface 225a. Thus, the dark portion may still be generated in the region, as shown in the example of FIG. 10B. Therefore, the angle α' between the second inclined surface 225b and the first inclined surface 225a may be set to be greater than the angle β between the lower surface 151 of the bottom frame 150 and the light emitting region of the LED 128a.

With reference to the example of FIG. 10C, the angle α' between the second inclined surface 225b of the guide bar 220 of the main frame 200 and the first inclined surface 225a satisfies the condition of Expression 3. Thus, it can be confirmed that the dark portion due to the main frame 200 may not be seen along the edge of the liquid crystal panel 110. Accordingly, it can also be confirmed that no wave mura phenomenon may occur at the boundary between the dark portion and the bright portion.

As described above, in the LCD device 100 according to the third example embodiment of the present disclosure, the liquid crystal panel 110 and the backlight unit 120 (see FIG. 2) may be integrally modularized using only the main frame 200 and the bottom frame 150. Thus, features of being lightweight, thin, and having a narrow bezel can be realized, and process costs can also be reduced by removing the top frame 40 (see FIG. 1) (e.g., a top cover or an upper cover) made of a metal material.

Further, the liquid crystal panel 110 and the glass diffuser 300 may be fixedly attached to each other by the first adhesive member 180a, and the glass diffuser 300 and the main frame 200 may also be fixedly attached to each other by the second adhesive member 180b. Thus, a narrow bezel can be realized, and features of being lightweight and thin can be realized.

A width d2 (see FIG. 3) of the second adhesive member 180b, by which the glass diffuser 300 and the main frame 200 may be fixedly attached to each other, may be greater (e.g., wider) than a width d1 (see FIG. 3) of the first adhesive member 180a by which the liquid crystal panel 110 and the glass diffuser 300 may be fixedly attached to each other. Thus, a narrow bezel corresponding to the width d1 (see FIG. 3) of the first adhesive member 180a can be realized, and the liquid crystal panel 110 and the backlight unit 120 can be more stably and integrally modularized.

For example, in the LCD device 100 according to the third example embodiment of the present disclosure, the inclined surface 225 of the guide bar 220 of the main frame 200 may be divided and formed into a first inclined surface 225a and a second inclined surface 225b, and the first inclined surface 225a and the second inclined surface 225b may be formed to have different angles. Thus, the generation of the dark portion due to the main frame 200 can be reduced or prevented. Accordingly, an occurrence of a wave mura phenomenon at the boundary between the dark portion and the bright portion can be reduced or prevented.

As described above, according to the present disclosure, a liquid crystal panel and a backlight unit may be integrally modularized using only a main frame and a bottom frame, the liquid crystal panel and a glass diffuser may be fixedly attached to each other using a first adhesive member, and the glass diffuser and the main frame may be fixedly attached to each other using a second adhesive member having a wider width than the first adhesive member. Therefore, an LCD device, which is lightweight, thin, and has a narrow bezel, can be implemented, and process costs can also be reduced.

Further, the liquid crystal panel and the backlight unit can be more stably and integrally modularized. For example, the main frame may be configured to have a pattern portion, or to have a chamfer portion or first and second inclined surfaces. Thus, an occurrence of light unevenness phenomenon caused by edge irregularity can be reduced or prevented and an occurrence of wave mura phenomenon at a boundary between a dark portion and a bright portion can also be reduced or prevented.

It will be apparent to those skilled in the art that various modifications and variations may be made in the present disclosure without departing from the technical idea or scope of the disclosure. Thus, it is intended that embodiments of the present disclosure cover the modifications and variations of the disclosure provided they come within the scope of the appended claims and their equivalents.

What is claimed is:

1. A liquid crystal display device, comprising:
a backlight unit comprising:
a light-emitting diode (LED) assembly comprising a plurality of LEDs;
a glass diffuser above the plurality of LEDs; and
a reflector under the plurality of LEDs;
a liquid crystal panel above the glass diffuser, a portion of a back edge of the liquid crystal panel being attached to the glass diffuser by a first adhesive member having a first width;
a main frame surrounding a side of the liquid crystal panel and the backlight unit, the main frame comprising:
a vertical portion; and
a guide bar, the guide bar protruding from the vertical portion; and
a bottom frame comprising a lower surface under the backlight unit,
wherein the glass diffuser is above the main frame, and
wherein the main frame is attached to a portion of the glass diffuser by a second adhesive member having a second width greater than the first width.

2. The liquid crystal display device of claim 1, wherein the guide bar comprises:
an upper surface extending from an upper surface of the vertical portion; and
an inclined surface having an obtuse angle with respect to the upper surface, and extending toward the lower surface of the bottom frame.

3. The liquid crystal display device of claim 2, wherein a pattern portion is on the inclined surface.

4. The liquid crystal display device of claim 3, wherein:
the pattern portion is provided in ⅓ of a region of the inclined surface; and
the pattern portion is positioned in a sub-region of the ⅓ of a region, the sub-region being adjacent to the liquid crystal panel.

5. The liquid crystal display device of claim 3, wherein:
the pattern portion has:
a first density in a portion of the guide bar closer to the upper surface of the guide bar; and
a second density in a portion of the guide bar closer to the lower surface of the bottom frame; and
the first density is greater than the second density.

6. The liquid crystal display device of claim 3, wherein the pattern portion is concavely or convexly formed as one or more of: a semicircular pattern, an elliptical pattern, a polygonal pattern, and a hologram pattern.

7. The liquid crystal display device of claim 2, wherein:
the guide bar further comprises a right angle portion parallel to the vertical portion between the upper surface of the guide bar and the inclined surface; and
the upper surface of the guide bar is inclined from the upper surface of the vertical portion toward the lower surface of the bottom frame.

8. The liquid crystal display device of claim 2, wherein an angle between the inclined surface of the guide bar and the lower surface of the bottom frame is greater than $\beta$ and smaller than 90°, where '$\beta$' is an angle between the lower surface of the bottom frame and a light-emitting region of the LED.

9. The liquid crystal display device of claim 2, wherein the inclined surface comprises:
a first inclined surface extending from the upper surface of the guide bar; and
a second inclined surface having a different angle with respect to the lower surface of the bottom frame from the first inclined surface, and extending from the first inclined surface toward the lower surface of the bottom frame.

10. The liquid crystal display device of claim 9, wherein a height of the second inclined surface is equal to (X tan $\beta$+b),
where:
0 mm<b<3 mm,
'$\beta$' is an angle between the lower surface of the bottom frame and a light-emitting region of the LED, and
'X' is a distance between the second inclined surface and a center of the LED.

11. The liquid crystal display device of claim 10, wherein the second inclined surface is parallel to the vertical portion.

12. The liquid crystal display device of claim 9, wherein the second inclined surface is bent from the first inclined surface toward the vertical portion.

13. The liquid crystal display device of claim 12, wherein an angle between the second inclined surface and the first inclined surface is greater than $\beta$ and smaller than 90°, where '$\beta$' is an angle between the lower surface of the bottom frame and the light-emitting region of the LED.

14. The liquid crystal display device of claim 9, wherein a contact portion between the first inclined surface and the second inclined surface is disposed between the bottom frame and the glass diffuser to be closer to the bottom frame.

15. The liquid crystal display device of claim 9, wherein a height of the contact portion from the bottom frame is greater than a height of the LED from the bottom frame.

16. The liquid crystal display device of claim 1, wherein the guide bar comprises:
an inclined surface having an obtuse angle with respect to an upper surface of the vertical portion, and extending toward the lower surface of the bottom frame; and
a chamfer portion provided between the inclined surface and the upper surface of the vertical portion.

17. The liquid crystal display device of claim 16, wherein a corner of the upper surface of the vertical portion has a curved shape.

18. The liquid crystal display device of claim 1, wherein:
   the bottom frame further comprises a side surface protruding from an end of the lower surface; and
   the side surface of the bottom frame is between the vertical portion and the guide bar.

19. The liquid crystal display device of claim 1, wherein:
   a lower end of the vertical portion has a first height from the lower surface of the bottom frame;
   a lower end of the guide bar has a second height from the lower surface of the bottom frame; and
   the first height is greater than the second height.

\* \* \* \* \*